United States Patent
Taguchi et al.

(10) Patent No.: US 8,712,823 B2
(45) Date of Patent: Apr. 29, 2014

(54) SYSTEM, METHOD AND PROGRAM RECORDING MEDIUM FOR SUPPLY CAPACITY ESTIMATION

(75) Inventors: Kentaro Taguchi, Hiratsuka (JP); Takahiro Ogawa, Yokohama (JP); Akihisa Tsujibe, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/568,636

(22) Filed: Aug. 7, 2012

(65) Prior Publication Data

US 2013/0197972 A1 Aug. 1, 2013

(30) Foreign Application Priority Data

Jan. 30, 2012 (JP) ................................ 2012-016136

(51) Int. Cl.
*G06Q 10/00* (2012.01)
(52) U.S. Cl.
USPC .......................... 705/7.31; 705/7.25; 705/7.11
(58) Field of Classification Search
USPC ....................................... 705/7.11, 7.25, 7.31
See application file for complete search history.

(56) References Cited

U.S. PATENT DOCUMENTS

| | | | | |
|---|---|---|---|---|
| 5,787,000 | A * | 7/1998 | Lilly et al. | 700/95 |
| 6,055,519 | A * | 4/2000 | Kennedy et al. | 705/80 |
| 6,996,538 | B2 * | 2/2006 | Lucas | 705/28 |
| 7,181,419 | B1 * | 2/2007 | Mesaros | 705/26.2 |
| 7,216,086 | B1 * | 5/2007 | Grosvenor et al. | 705/7.11 |
| 2001/0051905 | A1 * | 12/2001 | Lucas | 705/29 |
| 2002/0026403 | A1 * | 2/2002 | Tambay et al. | 705/37 |
| 2002/0095307 | A1 * | 7/2002 | Greamo et al. | 705/1 |
| 2002/0198756 | A1 * | 12/2002 | Ghaisas et al. | 705/8 |
| 2003/0182240 | A1 * | 9/2003 | Eda et al. | 705/64 |
| 2005/0075949 | A1 * | 4/2005 | Uhrig et al. | 705/28 |
| 2005/0197929 | A1 * | 9/2005 | Lucas | 705/28 |
| 2006/0100937 | A1 * | 5/2006 | Lucas | 705/26 |
| 2006/0116936 | A1 * | 6/2006 | Lucas | 705/28 |
| 2011/0246274 | A1 * | 10/2011 | Mesaros | 705/14.19 |
| 2011/0307398 | A1 * | 12/2011 | Reinhardt et al. | 705/319 |

FOREIGN PATENT DOCUMENTS

| | | |
|---|---|---|
| JP | 2008-052438 A | 3/2008 |
| JP | 2009-301466 A | 12/2009 |

* cited by examiner

*Primary Examiner* — Johnna Loftis
(74) *Attorney, Agent, or Firm* — Foley & Lardner LLP

(57) ABSTRACT

Technology for realizing reductions in time required for production plan by estimating supply capacities of suppliers is provided. A system has a function of registering and displaying transaction information including delivery requests from a buyer including number of required parts and delivery responses from a supplier including number of suppliable parts, a function of managing the series of transaction information as transaction history information on a DB, and an estimating function of estimating supply capacities of parts of the supplier with respect to the delivery responses in reply to delivery requests. The estimating function performs processes of estimating supply capacities by determining numbers of suppliable parts of past delivery responses with respect to numbers of required parts of past delivery requests by using the delivery request history information, the delivery response history information and the process LT information, and outputting a screen including the estimated result information to users.

13 Claims, 16 Drawing Sheets

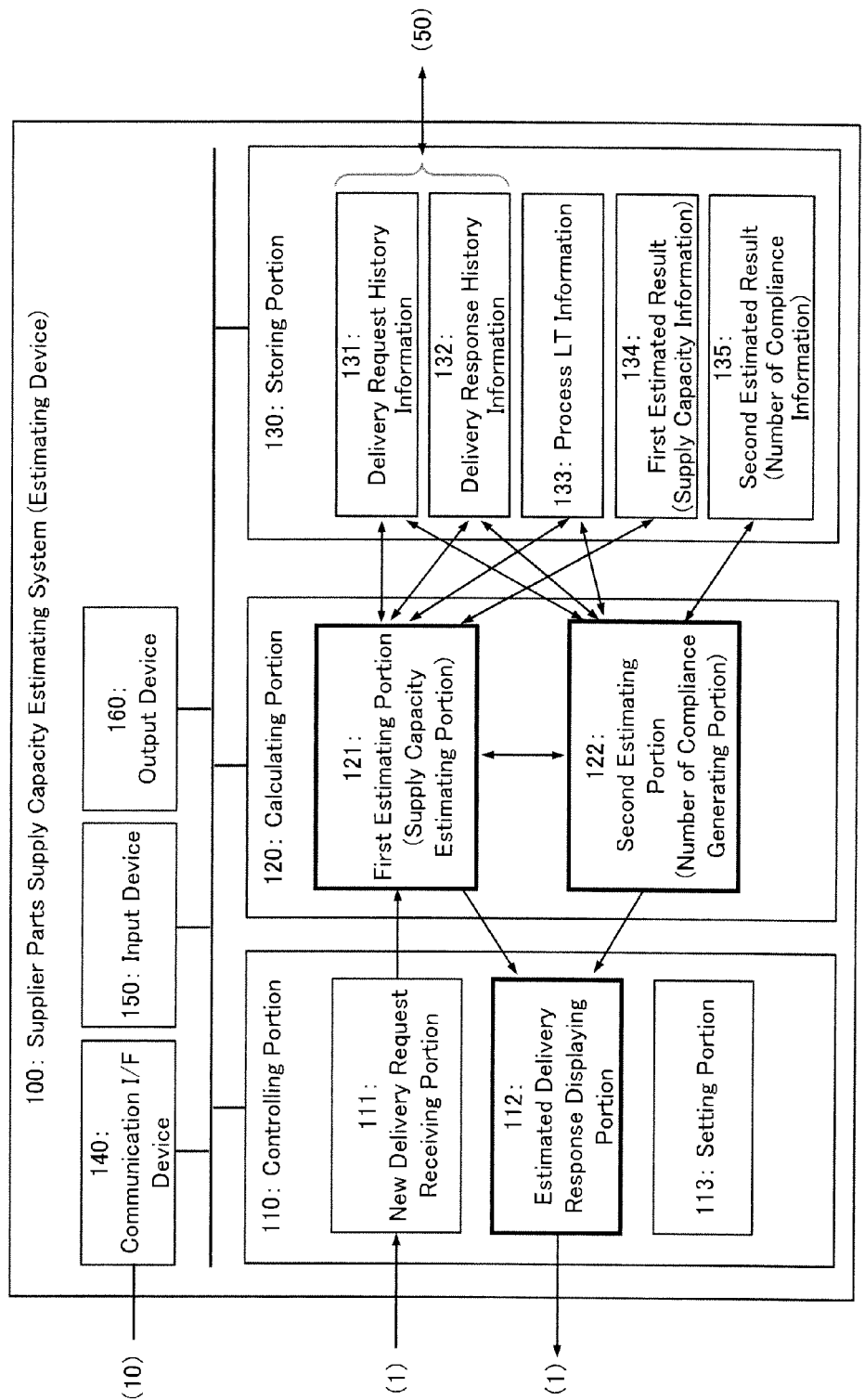

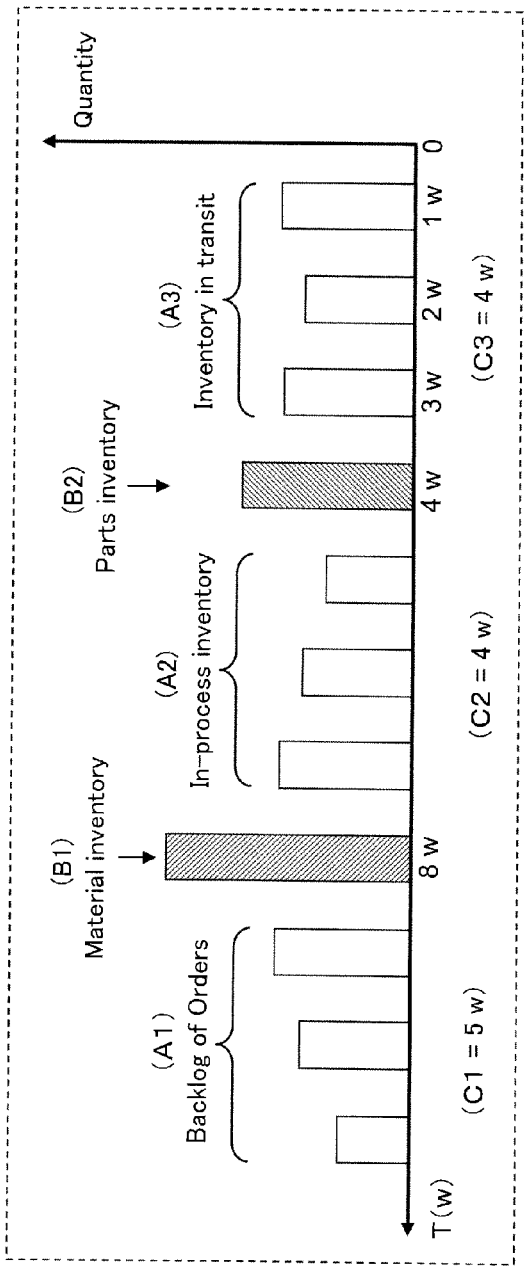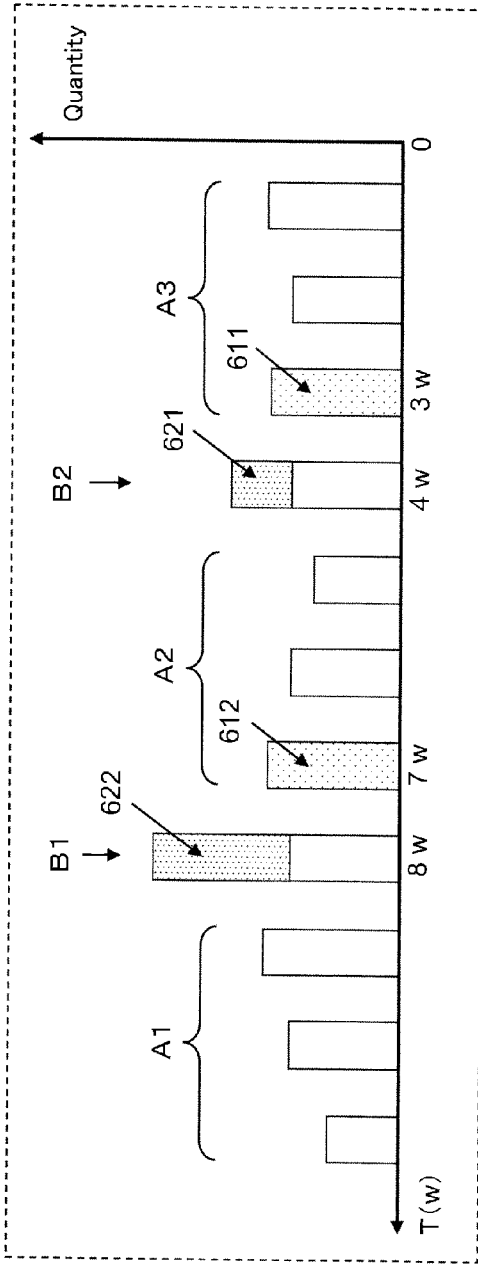
FIG. 6A
FIG. 6B

FIG. 9B

Delivery Request History (131)

| BaseDate | 4/4 | 4/11 | 4/18 |
|---|---|---|---|
| 2011/1/ 3 | 336 | 344 | 344 |
| 1/10 | 336 | 344 | 344 |
| 1/17 | 288 | | |
| 1/24 | 288 | | |
| 1/31 | 288 | 416 | 416 |
| 2/ 7 | 416 | 424 | 424 |
| 2/14 | 480 | 416 | 416 |
| 2/21 | 384 | | 384 |
| 2/28 | | | |
| 3/ 7 | | | |
| 3/14 | | | |

Request: 416 to 480, increase by +64

Delivery Date →

FIG. 9A

Delivery Response History (132)

| BaseDate | 4/4 | 4/11 | 4/18 | 4/25 | 5/2 |
|---|---|---|---|---|---|
| 2011/1/ 3 | 336 | 344 | 344 | 344 | 272 |
| 1/10 | 336 | 344 | 344 | 344 | 272 |
| 1/17 | 288 | | | | 288 |
| 1/24 | 288 | | | | 384 |
| 1/31 | 288 | 416 | 416 | 416 | 384 |
| 2/ 7 | 416 | | | 384 | |
| 2/14 | 448 | | 448 | | |
| 2/21 | | | | | |
| 2/28 | | | | | |
| 3/ 7 | | | | | |
| 3/14 | | | | | |

Response: 416 to 448, compliable up to +32

Delivery Date →

Transit Process (3 w)   Manufacture Process (3 w)

FIG. 11A

131: Delivery Request History

| Item | Supplier | Time Point | Delivery Date | Quantity |
|---|---|---|---|---|
| P001 | Company C | 2011/01/03 | 2011/04/04 | 336 |
| P001 | Company C | 2011/01/10 | 2011/04/04 | 336 |
| P001 | Company C | 2011/01/17 | 2011/04/04 | 288 |
| P001 | Company C | 2011/01/24 | 2011/04/04 | 416 |
| ... | ... | ... | ... | ... |

FIG. 11B

132: Delivery Response History

| Item | Supplier | Time Point | Delivery Date | Quantity |
|---|---|---|---|---|
| P001 | Company C | 2011/01/03 | 2011/04/04 | 336 |
| P001 | Company C | 2011/01/10 | 2011/04/04 | 336 |
| P001 | Company C | 2011/01/17 | 2011/04/04 | 288 |
| P001 | Company C | 2011/01/24 | 2011/04/04 | 416 |
| ... | ... | ... | ... | ... |

FIG. 11C

New Delivery Request (1101)

| Item | Supplier | Delivery Date | Quantity |
|---|---|---|---|
| P001 | Company C | 2011/04/04 | 336 |
| P001 | Company C | 2011/04/11 | 336 |
| P001 | Company C | 2011/04/18 | 288 |
| P001 | Company C | 2011/04/25 | 416 |
| ... | ... | ... | ... |

FIG. 11D

Process LT Information (133)

| Item | Supplier | Process Level | Process LT |
|---|---|---|---|
| P001 | Company C | 1 | 4 |
| P001 | Company C | 2 | 4 |
| P001 | Company C | 1 | 2 |
| P001 | Company C | 2 | 6 |
| ... | ... | ... | ... |

FIG. 16

Estimated Delivery: Response (Estimated Supply Capacity)

Present Time: 2011/2/28

| Item | Supplier | Adjustment Necessary | 04/04 | 04/11 | 04/18 | 04/25 | 05/02 | 05/09 | ... |
|---|---|---|---|---|---|---|---|---|---|
| P001 | Company C | | 448 | ★ | 384 | 416 | 384 | 416 | ... |
| P004 | Company C | ○ | 384 | 416 | 384 | 288 | 384 | 416 | ... |
| P001 | Company C | | 384 | 416 | 384 | 416 | 384 | 416 | ... |
| ... | | | ... | ... | ... | ... | ... | ... | ... |

Delivery Date →

Select Item

-96 ← Display Number

☆ : OK judgment by first estimating function
★ : OK judgment by second estimating function
Number : NG judgment → Adjustment needed (○)

SYSTEM, METHOD AND PROGRAM RECORDING MEDIUM FOR SUPPLY CAPACITY ESTIMATION

CROSS-REFERENCE TO RELATED APPLICATION

The present application claims priority from Japanese Patent Application No. 2012-016136 filed on Jan. 30, 2012, the content of which is hereby incorporated by reference into this application.

TECHNICAL FIELD OF THE INVENTION

The present invention relates to information processing technology related to product production planning, parts procurement management, SCM and EDI. It particularly relates to an information processing system for supporting businesses such as production plan adjustments (dates and quantities) and businesses related to transactions (accepting and ordering) between buyers and suppliers of parts.

BACKGROUND OF THE INVENTION

In accordance with progresses in globalization of enterprises, numerous suppliers and factories (factories that manufacture products using parts) are dotted globally. Accordingly, processes of confirming parts delivery responses in reply of parts delivery requests and of adjusting production plans for each combination of suppliers and factories become quite complex for buyers and production planners.

Technologies of optimally drafting parts delivery requests to multiple suppliers on the basis of production plans of a plurality of factories already exist. However, such production plans continuously change in accordance with fluctuations in demand of products or the like. It regularly and frequently happens that once drafted parts delivery requests to suppliers (number of required parts, etc.) are changed based on such fluctuations in demand or the like. In such instance, it is necessary for suppliers to confirm and to create a delivery response whether it is possible to carry out (supply) the changed parts delivery request (number of required parts, etc.) and the buyers need to inquire and receive responses in reply to such delivery requests. The suppliers require a certain span (for instance, one to two days) for confirming and creating such delivery responses.

A system that supports transactions of parts between buyers and suppliers (accepting and ordering) for realizing optimization of delivery adjustments is already known as underlying art. In one example of such a system, a support service is provided in which a server or similar is provided on the network (internet) to which buyers and suppliers can respectively access for registering or displaying transaction information through Web interfaces or similar. The buyers register delivery requests to suppliers on the system including information regarding numbers of required parts in accordance with their product production plans. Suppliers register delivery responses to the system including number of suppliable parts in reply to such delivery requests of buyers. It is thereby possible to optimize delivery adjustments.

There are known as prior art, among others, Japanese Patent Laid-Open Publication No. 2009-301466 (Patent Document 1) and Japanese Patent Laid-Open Publication No. 2008-52438 (Patent Document 2).

In Patent Document 1 (Method for supporting optimization of supply chains), it is described that it is possible to prevent delays in production owing to stockout of materials and delays in shipping due to lack in product inventory even in the presence of fluctuations in sales plans due to abrupt increases in sales numbers which are beyond preliminarily estimated sales fluctuations.

In Patent Document 2 (System for supporting sales plan evaluations), it is described to visualize transitions in inventory balances depending on timings of reviewing sales plans and to support evaluation of effects that decision making timings of plan changes have on business indicators.

SUMMARY OF THE INVENTION

It is a drawback of the above conventional system examples that in case delivery requests (numbers of required parts, etc.) from buyers to suppliers have been changed, the buyers need to await delivery responses (number of suppliable parts, etc.) from the suppliers to know whether the suppliers in questions are capable of supplying the changed numbers of required parts. In other words, there is room for improving efficiency of businesses such as adjusting demand and supply or adjusting production plans between buyers and suppliers.

It should be noted that while Patent Document 1 refers to inventory parts upon estimating fluctuations in production plans, the technology does not regard estimations of supply capacities of suppliers.

It should also be noted that while Patent Document 2 is a technology in which effects of plan adjustments at multiple timings (time points) can be regarded, the technology does not regard estimations of supply capacities of suppliers.

In view of the above, it is a major purpose of the present invention to provide a technology for realizing reductions in demand and supply adjustments and production plan adjustments by estimating supply capacities of suppliers with respect to a technology of supporting transactions of parts between buyers and suppliers.

A representative form of the present invention is a system or similar for supporting transactions of parts between buyers and suppliers that performs information processing (parts transaction system, supplier parts supply capacity estimating system) which is characterized by the following configuration.

The present invention provides an estimating function of estimating parts supply capacities of suppliers (supplier parts supply capacity estimating function). The present system is provided with a transaction information displaying function, a transaction history managing function and the above-mentioned estimating functions that are realized through information processing using a computer.

The transaction information displaying function is a function through which buyers and suppliers can register information (transaction information) related to transactions of parts including delivery requests and delivery responses, mutually display and confirm. The transaction information displaying function further provides a screen (GUI) for displaying information including estimated results information performed by the estimating functions to buyers and production planners.

The transaction history managing function is a function of managing and ascertaining data information including transaction information that are registered and displayed by the transaction information displaying function in the DB as chronological transaction history information including past and present transaction information. The transaction history managing function is capable of extracting past and present transaction information by retrieving the DB in terms of respective buyers, suppliers, parts, chronological orders or orders of delivery dates.

In the estimating functions, supplier parts supply capacities (possibility/impossibility of supply, number of suppliable parts, etc.) are automatically estimated in accordance with the following method/logic for outputting estimated results information when production plans are adjusted (particularly when the numbers of required parts are changed) and when delivery requests are made from buyers to suppliers. With this arrangement, it is possible to reduce confirmation information exchanges by humans (for example, between persons in charge of buyers and persons in charge of suppliers) and to achieve reductions in production plan adjustments (determination).

(1) As a first estimating function, quantities of elements such as inventories in transit, in-process inventories and backlog of orders on the supplier side are estimated while referring to the contents of delivery responses of suppliers (number of suppliable parts, etc.) in reply to past delivery requests of buyers (number of required parts, etc.) using the transaction history managing function (transaction history information). Based on the estimated value, supplier parts supply capacities (possibility/impossibility of supply, number of suppliable parts, etc.) that are based on quantities of elements such as inventories in transit, in-process inventories and backlog of orders on the supplier side are estimated from delivery responses at a reference time point which has been temporally retroacted (offset) from time points of arrival of parts on the buyer side (delivery date) by respective process lead times of the supplier (parts transit lead time, parts manufacture lead time, material procurement lead time, etc.), the estimated result is stored and output as first estimated result information.

(2) As a second estimating function, an index value (number of compliance) is calculated which represents that the delivery responses of suppliers (number of suppliable parts, etc.) could have complied (coped with) the changes (particularly increased amounts) in delivery requests of the buyers (number of required parts, etc.) in the past using the transaction history managing function (transaction history information). The suppliers can comply (cope) with the above changes (increased amounts) by using material inventories and parts inventories (reserves). The supplier parts supply capacities (possibility/impossibility of supply, number of suppliable parts, etc.) that are based on quantities of elements of material inventories and parts inventories are estimated from this index value (number of compliance), the result of which is stored and output as second estimated result information.

The present system is a supply capacity estimating system that performs information processing for supporting transactions of parts between a buyer and a supplier via a communication network, the system comprising a transaction information displaying function of registering and displaying, on a screen, information regarding delivery requests from the buyer including number of required parts and transaction information of such parts including delivery response from the supplier such as number of suppliable parts; a transaction history managing function of storing and managing the series of transaction information of parts obtained by the transaction information displaying function as transaction history information on a DB in chronological order; and an estimating function of estimating supply capacity of the supplier with respect to the delivery responses of the supplier in reply to the delivery requests of the buyer.

The estimating function performs a process of acquiring, from the DB, delivery request history information related to delivery requests from the buyer; a process of acquiring, from the DB, delivery response history information related to the delivery responses from the supplier; a process of acquiring process lead time information related to provision of parts from the supplier; a process of estimating the parts supply capacity of the supplier in form of estimated number of suppliable parts or possibility/impossibility of supply by determining numbers of suppliable parts of past delivery responses with respect to the number of required parts of past delivery requests by using the delivery request history information, delivery response history information and the process lead time information, creating and storing the results as estimated result information; and a process of outputting a screen including the estimated result information to user.

According to a representative embodiment of the present invention, it is possible to realize reductions in demand and supply adjustments and production plan adjustments by estimating supply capacities of suppliers with respect to a technology of supporting transaction of parts between buyers and suppliers.

Buyers and production planners can determine production plan adjustments without awaiting confirmations and delivery responses (number of suppliable parts, etc.) from suppliers. It is therefore possible to anticipate large reductions in production plan adjusting times. These effects give grounds to expectations of increased sales and reductions in inventories thanks to rapid responses to fluctuations in demands.

BRIEF DESCRIPTIONS OF THE DRAWINGS

FIG. 3 is a diagram showing a configuration of a supplier supply capacity estimating system (estimating device) according to one embodiment of the present invention;

FIG. 6A is a diagram for explaining an example related to estimation in the present embodiment;

FIG. 6B is a diagram for explaining an example related to estimation in the present embodiment;

FIG. 9A is a diagram for explaining an outline and an example of a second logic using a second estimating function;

FIG. 9B is a diagram for explaining an outline and an example of the second logic using the second estimating function;

FIG. 11A is a diagram showing an input information data example;

FIG. 11B is a diagram showing an input information data example;

FIG. 11C is a diagram showing an input information data example;

FIG. 11D is a diagram showing an input information data example;

FIG. 16 is a diagram showing a display screen of estimated delivery response information which is one example of a screen that is displayed to a user by means of an estimating device.

DESCRIPTIONS OF THE PREFERRED EMBODIMENT

Figure 1:
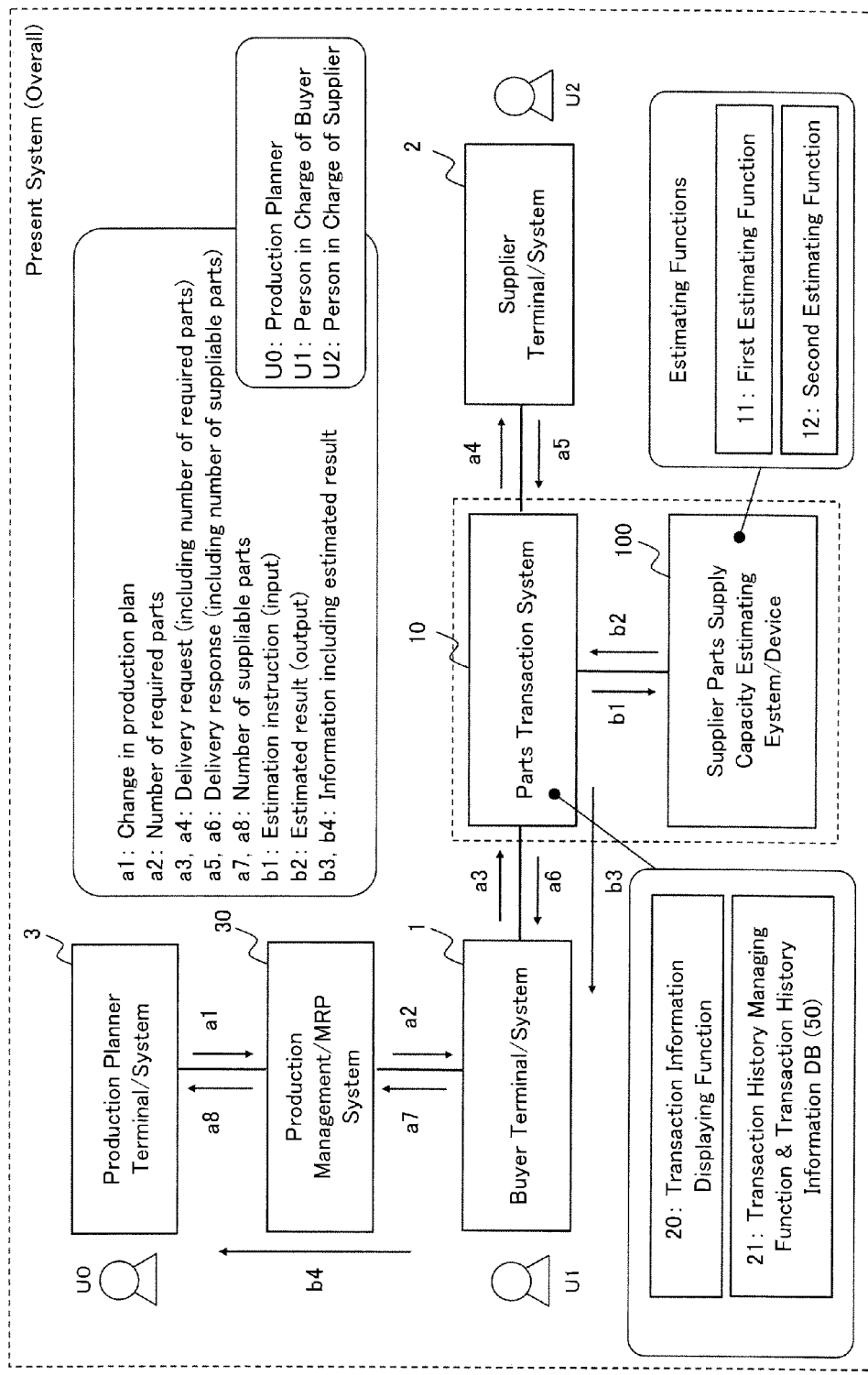
FIG. 1 is a diagram showing an overall configuration of a system (parts transaction system and supplier supply capacity estimating system) according to one embodiment of the present invention.
Figure 2:
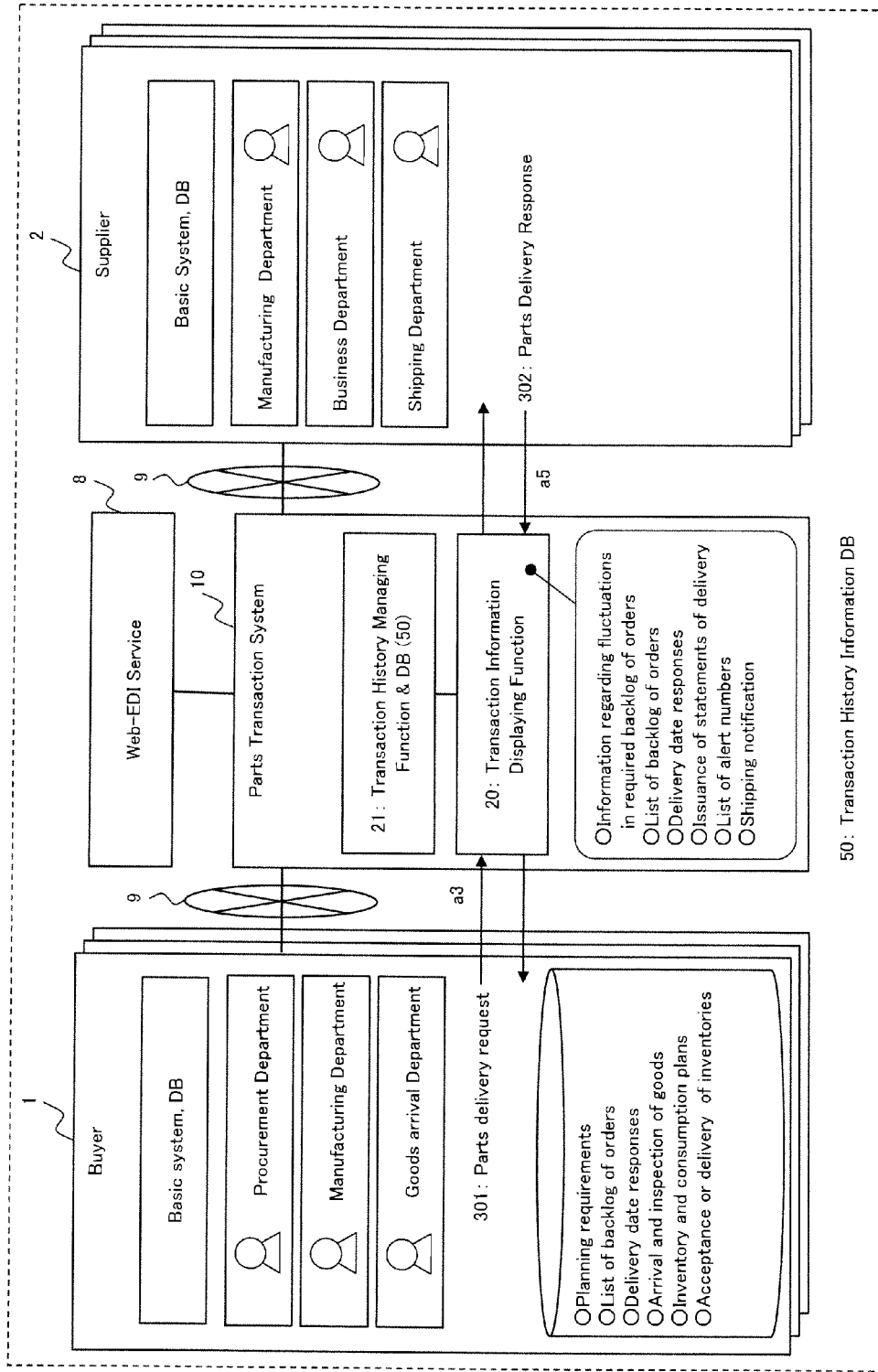
FIG. 2 is a diagram showing a configuration example of a parts transaction system between a buyer and suppliers according to one embodiment of the present invention, wherein a transaction history managing function has been added to a parts transaction system which is an underlying art system.

An embodiment of the present invention will be explained in details while referring to the drawings. It should be noted that in all of the drawings for explaining the embodiment of the present invention, the same parts are generally marked with the same reference numerals and repetitive explanations thereof will be omitted. The present embodiment comprises a system configuration as illustrated in FIGS. 1 to 3, and pieces of information are transferred between elements in a sequence as illustrated in FIG. 4B. In the present system, estimation is performed in accordance with a concept as will be explained in FIGS. 5 to 9B. The present system performs processes as shown in FIGS. 10 to 15. In the present system, a screen as shown in FIG. 16 is displayed.

A conventional parts transaction system between buyers and suppliers only preserves latest transaction information (delivery request (number of required parts) information from a buyer and delivery response (number of suppliable parts) information from suppliers). On the other hand, the system of the present embodiment is arranged in that a conventional parts transaction system (transaction information displaying function 20) is added with a function of managing transaction history information in a DB 50 (transaction history managing function 21) (FIG. 2). The present system provides, as shown in FIG. 1, estimating functions (first estimating function 11, second estimating function 12) in which processes of estimating parts supply capacities of suppliers (possibility/impossibility of supply and number of suppliable parts, etc.) are performed with a specified method/logic using the DB 50 (transaction history information) and process LT information, etc.

[System (1)]

FIG. 1 shows an example of an overall configuration of a system according to one embodiment (configured to include a parts transaction system and a supplier supply capacity estimating system). The overall system is configured in that, among others, a buyer (buyer terminal/system) 1, a supplier (supplier terminal/system) 2, a production planner (production planner terminal/system) 3, a parts transaction system 10, a supplier parts supply capacity estimating system 100 (abbreviated as estimating system/estimating device) and a production management/MRP system 30 are connected on a communication network. It is configured in that the supplier parts supply capacity estimating system 100 is additionally connected and coordinated to the parts transaction system 10 between the buyer 1 and the supplier 2 (FIG. 2 to be described later, underlying technology, basic portion). The estimating system 100 could also be equipped as a part of the parts transaction system 10.

The buyer (buyer terminal/system) 1 is a terminal or system that a person in charge U1 of the buyer utilizes and is for business use for placing orders for (purchasing) parts or the like. The supplier (supplier terminal/system) 2 is a terminal or system that a person in charge U2 of the supplier utilizes and is for business use for receiving orders for (selling) parts or the like. The production planner (production planner terminal/system) 3 is a terminal or system that a production planner U0 utilizes and is for business use for production plans of products or the like.

The production management/MRP system 30 is a production management system or an MRP system to which the production planner 3 or the buyer 1 can access for utilization thereof. Production management and MRP (materials planning) are known in the art. The production management/MRP system 30 registers and displays information regarding production planning of products such as number of required parts for manufacturing (comprising) the products or delivery dates.

The parts transaction system 10 includes a transaction information displaying function 20 and a transaction history managing function 21. The transaction information displaying function 20 performs processes of registering and displaying transaction information (delivery requests or the like) of the buyer 1 (U1) and of registering and displaying transaction information (delivery responses or the like) of the supplier 2 (U2). The transaction history managing function 21 stores and manages all of the transaction information that is processed by the transaction information displaying function 20 in a DB (50) as transaction history information.

The estimating system 100 includes a first estimating function 11 and a second estimating function 12 (details will be described later). The estimating functions (11, 12) are functions of performing estimating processes of parts supply capacities of the suppliers 2 (such as possibility/impossibility of supply and number of suppliable parts) using the DB (transaction history information) including information concerning past delivery responses (a5) of the suppliers 2 in reply to delivery requests (a3) of the buyer 1.

As one example of data information transfer, a1 indicates a change in production plan concerning MPR (30) made by the production planner 3 (U0). a2 indicates information such as number of required parts in accordance with a1. For instance, the buyer 1 (U1) acquires (or is automatically notified with) a2 information from the MPR system (30). a3 indicates registration of information concerning parts delivery requests (including number of required parts in accordance with a2) from the buyer 1 (U1) to the parts transaction system 10 (transaction information displaying function 20).

The following a4 to a8 are information in a conventional case (without estimation). a4 is information similar and corresponding to a3. For instance, the supplier 2 (U2) acquires (or is automatically notified with) parts delivery request information of a4 (including number of required parts) from the parts transaction system 10 (transaction information displaying function 20). a5 indicates registration of information concerning parts delivery responses (including number of suppliable parts) of the supplier 2 (U2) in reply to information of a3 (a4) from the supplier 2 (U2) to the parts transaction system 10 (transaction information displaying function 20). a6 is information similar and corresponding to a5. For instance, the buyer 1 (U1) acquires (or is automatically notified with) information of a6 regarding parts delivery responses (including number of suppliable parts) from the parts transaction system 10 (transaction information displaying function 20) a7 indicates information such as number of suppliable parts in accordance with a6. For instance, the buyer 1 (U1) registers a7 information to the MPR system (30). a8 is information similar and corresponding to a7. For instance, the production planner 3 (U0) acquires (or is automatically notified with) a8 information from the MPR system (30).

The following b1 to b4 are information unique to the present system. b1 indicates estimating instruction (input) from the parts transaction system 10 to the estimating device 100 through coordination in accordance with the delivery request (including number of required parts) of a3. With this arrangement, the estimating device 100 (11, 12) performs estimating processes regarding supplier parts supply capacities (possibility/impossibility of supply, number of suppliable parts, etc.). b2 is estimated result (output) information in reply to b1 that is coordinated from the estimating device 100 to the parts transaction system 10. b3 is information (particularly screen information) including estimated results from the parts transaction system 10 to the buyer 1 (U1) in accordance with b2. Similarly, b4 is information including estimated results from the buyer 1 to the production planner 3 (U0) in accordance with b3.

[System (2)]

FIG. 2 shows an example of a configuration of the parts transaction system 10 between a buyer 1 and supplier 2 according to the present embodiment which is configured in that a transaction history managing function 21 (and DB 50) and a coordination function with the estimating device 100 are added to the parts transaction system 10 (demand and supply adjustment supporting service, etc.) which is one example of an underlying art (prior art) system. The parts transaction system 10 is connected to a buyer terminal/system 1 (which might be provided in plural) and a supplier terminal/system 2 (which might be provided in plural) on the internet 9 through secure communication such as SSL. The parts transaction system 10 coordinates with, for instance, Web-EDI service 8 for input/output of orders and account purchase information.

For instance, the buyer 1 accesses the transaction information displaying function 20 of the parts transaction system 10 to register a parts delivery request (a3) on the display screen. The supplier 2 accesses the transaction information displaying function 20 of the parts transaction system 10 to confirm the parts delivery request (a3) on the display screen and to register a parts delivery response (a5) in return thereto. The buyer 1 then accesses the transaction information displaying function 20 of the parts transaction system 10 to confirm the parts delivery response (a5) information on the display screen. The transaction history managing function 21 stores the respective transaction information on the DB 50 as transaction history information.

In the underlying system, information sharing services between companies related to SCM including part buyers 1 and suppliers 2 and services supporting delivery date adjustment businesses (order businesses and order receiving businesses) that extend over a plurality of enterprises are provided in form of Web interfaces or SaaS. It is possible to share information of delivery and inventory conditions between buyers 1 and suppliers 2 in chronological order by combining a series of information related to SCM such as planning requirements by items (parts), backlog of orders, delivery date responses, arrival and inspection of goods and inventories. Conditions and problems related to demand and supply adjustment which fluctuate on daily basis are displayed on the Web screen or notified by E-mails as alerts of excesses and deficiencies of inventory or delays in delivery. With this arrangement, the buyer 1 (U1), for instance, can precondition and solve problems through early detection so as to reduce follow up operations to the supplier 2 (U2). The supplier 2 (U2), for instance, can refer and confirm a plurality of cases of a plurality of buyers 1 (U1) in form of a list, and since problems can be easily gained through a function of displaying a number of alerts, it is possible to specify cases that need to be solved at an early stage. The buyer 1 can reduce the time required for delivery date adjustment (reduce the number of processes) by reducing the number of inquiries from the suppliers 2 and through highly accurate responses regarding delivery dates.

The buyer 1 is comprised, among others, of a basic system and a DB of the company. On the buyer 1 side, persons (users) in procurement department, manufacturing department and goods arrival department can access using respective terminal devices. Information related to planning requirements, list of backlog of orders, delivery date responses, arrival and inspection of goods, inventory and consumption plans and acceptance or delivery of inventories are managed on the DB.

The supplier 2 is comprised, among others, of a basic system and a DB of the company. On the supplier 2 side, persons (users) in manufacturing department, business department and shipping department can access using respective terminal devices.

The parts transaction system 10 is comprised, among others, of a server, a DB and a LAN which are not shown in the drawings, and includes a transaction information displaying function 20 and a transaction history managing function 21 including various functions of system coordination interfaces (including coordinating functions with the estimating device 100), Web interfaces (provision of Web page screens) and helpdesks or the like. It displays through Web interfaces of respective foreign languages, for instance, information regarding fluctuations in required backlog of orders, list of backlog of orders, delivery date responses, issuance of statements of delivery, list of alert numbers or shipping notification (at least including delivery request information and delivery response information).

Types of information that the buyer 1 and supplier 2 disclose to other party can be respectively set.

[System (3)]

FIG. 3 shows an example of configuring the estimating device 100 by means of a single server device. The estimating device 100 comprises, among others, a controlling portion 110, a calculating portion 120, a storing portion 130, a communication I/F device 140, an input device 150, an output device 160 and buses. The controlling portion 110 and the calculating portion 120 are composed of software program processes that are performed by a CPU or a main memory, etc. (including a program recording medium for recording a corresponding program). The storing portion 130 is composed of a secondary storing device and its controlling processes. The communication I/F device 140 performs interface processes between the same and a network (9). The input device 150 and the output device 160 are a keyboard and a display which enable setting and inputting operations by users (administrators).

The controlling portion 110 comprises, as detailed processing portions, a new delivery request receiving portion 111, an estimated delivery response displaying portion 112, and a setting portion 113, etc. The new delivery request receiving portion 111 receives and inputs new delivery requests from buyers 1 (U1) via the parts transaction system 10. The estimated delivery response displaying portion 112 displays (transmits) information (especially a Web page) regarding a delivery response (supplier parts supply capacity) as estimated by the calculating portion 120 to the buyer 1 via the parts transaction system 10. The setting portion 113 inputs setting information through user input operations on the screen. The setting information include, for instance, contents of process LT information (133) and settings (selection of using one/both function(s) and various detailed settings) of estimating functions (11, 12). Though not shown in the drawings, it might also include a function of retrieving and acquiring transaction history information on the DB (50) or the like.

The calculating portion 120 comprises, as detailed processing portions, a first estimating portion (supply capacity estimating portion) 121 and a second estimating portion (number of compliance generating portion) 122. The first estimating portion 121 comprises the first estimating function 11. The second estimating portion 122 comprises the second estimating function 12.

The storing portion 130 stores therein delivery request history information 131, delivery response history information 132, process LT information 133, first estimated results (estimated supply capacity information) 134 and second estimated results (number of compliance information) 135, etc. The delivery request history information 131 and the delivery response history information 132 correspond to the above-described transaction history information of the DB 50 and can be acquired through communication with the parts transaction system 10 and by retrieving the DB 50. It should be noted that the system might also be configured in that the DB 50 (and the transaction history managing function 21) are provided on the estimating device 100 side.

[Sequence]

Figure 4A:
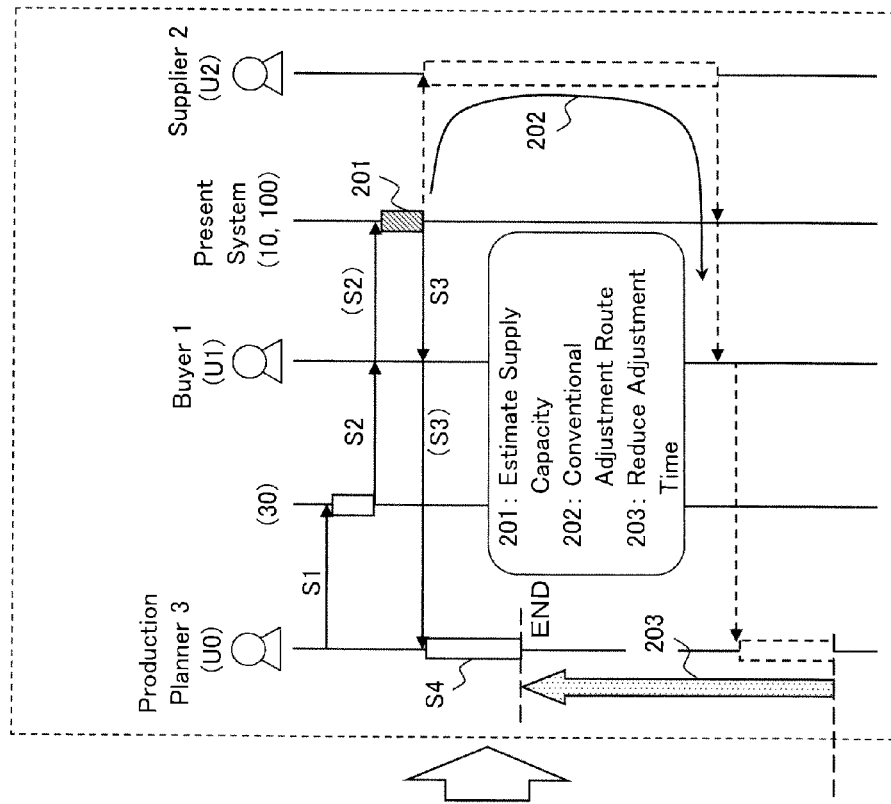
FIG. 4A is a diagram showing an example of a transaction sequence of a conventional system.
Figure 4B:
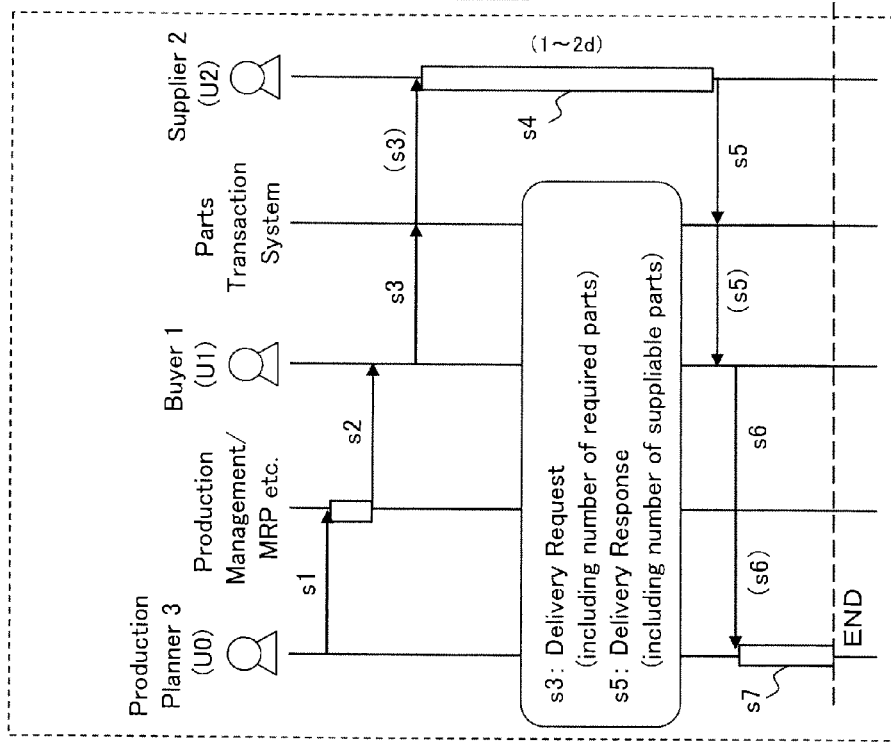
FIG. 4B is a diagram showing an example of a transaction sequence of the system of the present embodiment.

FIG. 4 illustrates an example of a sequence of information transfer among the production planner 3 (U0), the buyer 1 (U1) and the supplier 2 (U2). FIG. 4A is an example of a conventional system and FIG. 4B is an example of the system of the present embodiment (wherein reference numerals such as s1 or S1 indicate steps).

(s1) In FIG. 4A, the production planner U0 first registers information regarding a change in a production plan of a product to the production management/MRP system 30.

(s2) The production management/MRP system 30 transmits information regarding number of required parts in accordance with the change (s1) in production plan of the product to the person in charge U1 of the buyer 1. Alternatively, the person in charge U1 accesses the production management/MRP system 30 to refer to such information.

(s3) The person in charge U1 of the buyer 1 transmits a delivery request (including number of required parts) to the supplier 2 (person in charge U2) via the conventional parts transaction system on the basis of the above information regarding number of required parts (s2).

(s4) The person in charge U2 of the supplier 2 confirms and considers the above request (s3) and creates a delivery response. This might take a reasonable time (for instance, 1 or 2 day(s)).

(s5) The person in charge U2 of the supplier 2 transmits the delivery response (including number of suppliable parts) thus created to the buyer 1 (person in charge U1) via the parts transaction system. Alternatively, the person in charge U1 of the buyer 1 accesses the parts transaction system to refer to such information.

(s6) The person in charge U1 of the buyer 1 transmits information such as number of suppliable parts to the production planner 3 (U0) via the product management/MRP system 30 on the basis of the above response (s5).

(s7) The production planner 3 (U0) determines adjustments of the production plan on the basis of the above information regarding number of suppliable parts (s6).

(S1) Next, in FIG. 4B, the production planner 3 (U0) registers information regarding a change in a production plan of a product to the production management/MRP system 30 (same as s1).

(S2) The production management/MRP system 30 transmits information regarding number of required parts in accordance with the change (S1) in production plan of the product to the person in charge U1 of the buyer 1. Alternatively, the person in charge U1 accesses the production management/MRP system 30 to refer to such information (same as s2).

For instance, the person in charge U1 of the buyer 1 requests estimation of supplier supply capacity to the present system (10, 100) on the basis of the above information such as number of required parts (S2).

In the step as shown in 201, in reply of S2, the estimating device 100 performs processes of estimating the supplier supply capacity (number of suppliable parts, etc.) through the first estimating function 11 and the second estimating function 12 by using the transaction history information (past delivery requests and delivery responses, etc.) of the DB 50. The estimated result information is stored as first estimated result 134 and second estimated result 135.

(S3) The present system (10, 100) presents the estimated result information (134, 135) regarding the supplier supply capacity of above 201 to the buyer 1 (U1) through the transaction information displaying function 20 (estimated delivery response displaying portion 112). The person in charge U1 of the buyer 1 can ask for adjustments in production plans to the production planner 3 (U0) in accordance with the supplier supply capacity (number of suppliable parts, etc.) of the above estimated result. Alternatively, he/she can directly ask the production planner 3 (U0) to adjust production plans.

(S4) The production planner 3 (U0) can execute (determine) production plan adjustments in accordance with the information of S3.

Since the time for the buyer 1 of awaiting response from the supplier 2 can be omitted in case of the above process routes of S3 and S4, it is possible to reduce the time for production plan adjustment as in 203 when compared to FIG. 4A.

It is also possible to select, instead of the above process route, the conventional adjusting route (similar to FIG. 4A) as in 202. For instance, when the person in charge U1 of the buyer 1 determines that fluctuations in delivery responses (quantities) are large, he/she can make inquiries to the person in charge U2 of the supplier 2 through the conventional adjustment route of 202 to await a response before he/she makes adjustments.

[Estimating Function (1)]

The mechanism (solution) of estimation according to the present system will be explained with reference to FIG. 5 and others. For this purpose, respective locations of the supplier 2 and the buyer 1, the process LT (lead time) and the time (T) required for delivery to the buyer 1 are shown in schematic form in FIG. 5. In the upper part of FIG. 5, the right-hand side (511, 512) is the buyer 1 side, the center (521, 522) the supplier 2 side and the left-hand side (530) another supplier for providing raw materials (materials) to the supplier 2 for the manufacture of parts. 511 indicates a factory (storage) on the buyer 1 side and parts that arrive thereat (delivered thereto). 512 indicates production using the parts of 511 (CAM/CEF/RSD production, etc.). 521 indicates materials and their inventory that arrive at the factory (storage) of supplier 2. 522 indicates parts that are manufactured in the factory of supplier 2 using the materials of 521 and their storage/inventory.

C1, C2 and C3 indicate respective process LT in the supplier 2. C1 is a material procurement LT which is a period required from the material procurement of the supplier 2 from another supplier (530) up to the storage as material inventory (521, B1) (for example, 5 w (5 weeks)). C2 is a parts manufacture LT which is a period required from manufacture of parts by the supplier 2 using the materials of the material inventory (521) up to the storage as parts inventory (522) (for instance, 4 w) C3 is a parts transit LT which is a period required for transit and arrival of the parts of the parts inventory (522) of the supplier 2 to the factory (511) on the buyer 1 side (for instance, 4 w).

Figure 5:
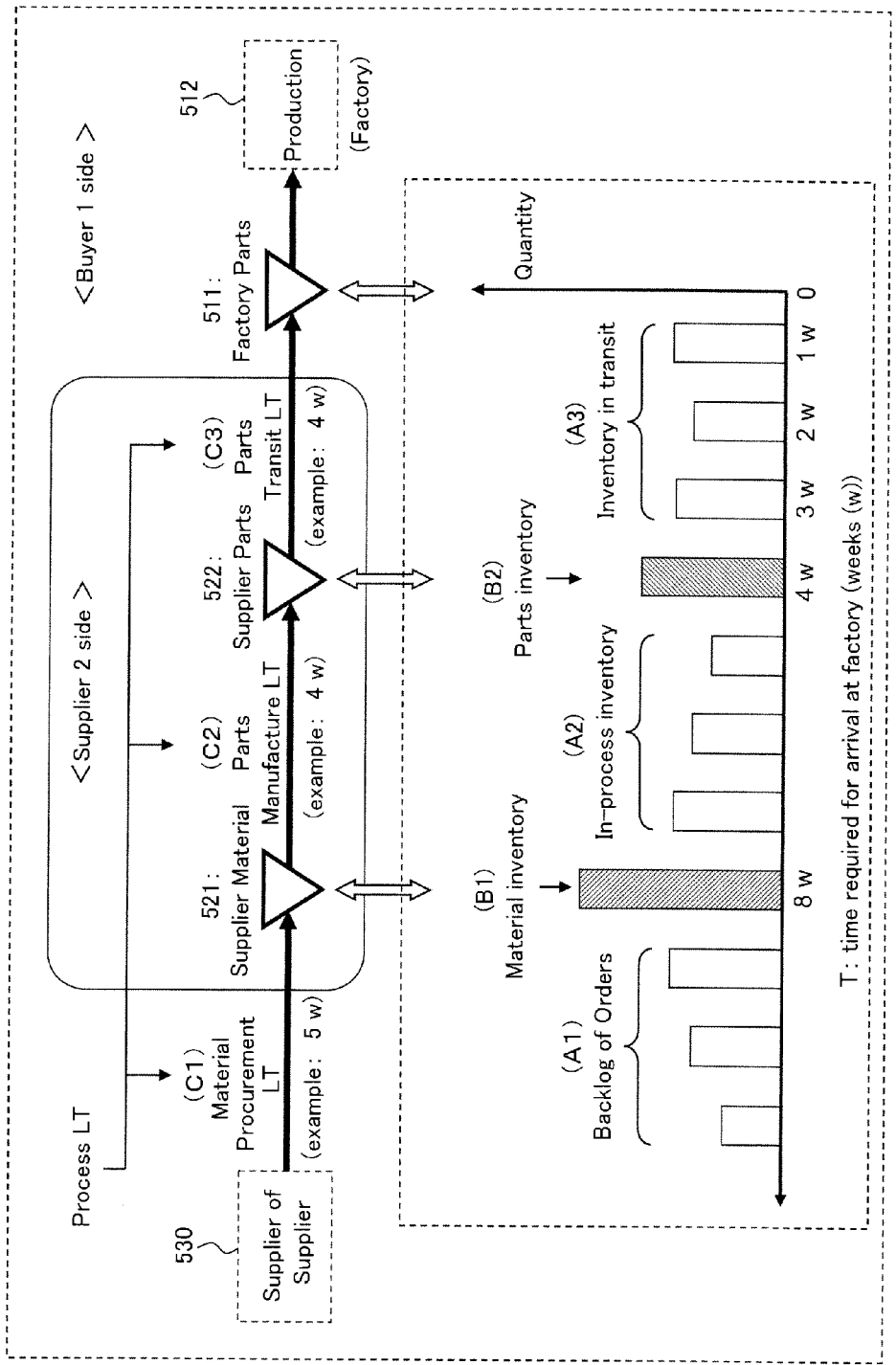
FIG. 5 is an explanatory diagram for explaining a mechanism of estimation in the present embodiment.

On the lower side of FIG. 5, there is shown a graph in which time T (unit: w (weeks)) for arrival (delivery) of parts to the buyer 1 side (511) is taken in a left-hand direction on the abscissa (direction going back in time) in accordance with the process LT (C1, C2, C3) on the upper side while quantities of parts inventories etc. (B1, B2, A1, A2, A3) are taken on the ordinate. Considerations are made in units of, for instance, 1 w while using the time point (delivery date) the parts have arrived on the buyer 1 side (511) as a reference (0 w).

B1 indicates material inventory of the factory on the supplier 2 side corresponding to 521. B2 indicates parts inventory of the factory on the supplier 2 side corresponding to 522. A1 indicates a backlog of orders in units of 1 w in accordance with material procurement LT (C1) from another supplier (530) to the supplier 2 side (521). A2 indicates in-process inventories in units of 1 w in accordance with the parts manufacture LT (C2) to the parts inventory B2 (522) from the material inventory B1 (521) at the factory of the supplier 2. A3 indicates a inventory in transit in units of 1 w in accordance with the parts transit LT (C3) from the parts inventory B2 (522) on the supplier 2 side to the buyer 1 side (521).

In the present embodiment, the parts supply capacity of the supplier 2 can be estimated as follows depending on the respective quantities of the five elements including material inventory B1, parts inventory B2, inventory in transit A3, in-process inventory A2 and backlog of orders A1.

In case values (information) of the five elements can be gathered at high frequencies and in an exact manner (at high accuracy), the supplier supply capacity can be calculated (gathered) without the necessity of estimation using the estimating function of the present system. However, a conventional system is not capable of performing such highly accurate gathering. This is, for instance, a case in which only a part of information that is managed by the supplier 2 is displayed from the supplier 2 to the buyer 1.

The system according to the present invention (embodiment) is characterized in that supplier supply capacities can be calculated (estimated) through the transaction history managing function 21 and the estimating functions (11, 12) even in a condition (an environment) in which supplier information cannot be gathered at high accuracy (not many pieces of information can be acquired) as described above. More particularly, according to the present system, supplier information (delivery response history 132 or process LT information 133 which are pieces of information that can be utilized for estimation) are acquired and gathered to some extent while utilizing the transaction history managing function 21 and others. Simultaneously, values of the five elements (A1 to A3, B1, B2) are estimated on the basis of the supplier information, and supplier parts supply capacities (possibility/impossibility of supply, number of suppliable parts, etc.) are calculated (estimated) utilizing such estimated values.

Pieces of information that are utilized for estimation in the present system include at least past transaction history information (delivery request and delivery response information by time points) (131, 132) and process LT information (C1, C2, C3) (133). It is not necessarily required to obtain information such as latest number of inventory, latest number of work in process or latest number of backlog of orders.

[Estimating Function (2)]

According to the estimating functions (11, 12) of the present system, {material inventory B1, parts inventory B2, backlog of orders A1, in-process inventory A2 and inventory in transit A3} of the supplier 2 are estimated by the following methods.

As a first method (by the first estimating function 11), quantities of the elements of inventory in transit A3, in-process inventory A2 and backlog of orders A1 are estimated depending on the achievements (delivery response history) what delivery responses (number of suppliable parts, etc.) (a5) the supplier 2 had made in reply to delivery requests (number of required parts, etc.) (a3) of the buyer 1. This estimation is made on the assumption that the supplier 2 is performing procurement and production on the basis of the delivery responses.

As a second method (by the second estimating function 12), quantities of the element of the material inventory B1 and parts inventory B2 are estimated depending on how delivery response (number of suppliable parts) the supplier 2 have complied (coped with) with respect to changes in delivery requests of the buyer 1 (for instance, increases in the number of required parts) in the past.

In the above-described example of a conventional system, the system merely maintains the latest transaction information that are displayed by a function corresponding to the transaction information displaying function 20 and is not equipped with the transaction history managing function 21 or estimating functions as in the present embodiment. In the system of the present embodiment, latest and past transaction informations (including delivery requests and delivery responses) are stored as transaction history information DB 50 using the transaction history managing function 21. Using this transaction history information, it is possible to gather how many delivery requests and delivery responses have been made by respective time points in the past and quantity values thereof in a retrospective manner in terms of time.

In the present system, a parts supply capacity of a supplier 2 is estimated through the following logics based on estimated values of the above elements (A1 to A3, B1, B2).

As a first logic (by the first estimating function 11), reference is made to delivery response information (132) at time points in the past obtained by offsetting (retroacting) the reference time point of FIG. 5 (T=0) by time durations of the process LT (C1, C2, C3) of the supplier 2, and the supply capacity is estimated from the delivery response information on the basis of the inventory in transit A3, the in-process inventory A2 and the backlog of orders A1. The order is A3, A2, A1 in view of the direction of retroaction.

As a second logic (by the second estimating function 12), the quantity of compliance (number of compliance) of suppliable parts included in the delivery response of the supplier 2 with respect to the amount of increase in the number of required parts included in the delivery request of the buyer 1 is calculated whereupon the supply capacity is estimated from the number of compliance on the basis of the material inventory B1 and the parts inventory B2.

[Estimating Function (3)]

An example related estimation by the above method/logic will be shown using FIGS. 6A and 6B. FIGS. 6A and 6B are graphs related to time T and quantity similar to that shown in FIG. 5.

(1-1) With reference to FIG. 6B, considerations will be made as one example related to the first estimating function 11 about the quantity of inventory in transit A3 at the spot of 611 at which the time T until arrival at the buyer 1 side is 3 w. The spot of 611 (3 w) is 1 w ahead from the time point (4 w) of shipping from the parts inventory B2 on the supplier 2 side, and it will take 3 w until arrival at the buyer 1 side. The quantity of A3 at 611 is considered to be a quantity obtained from the quantity of delivery request after 4 weeks (C3=4 w) (quantity of parts required in 4 weeks) with respect to a delivery request that the buyer 1 has presented 1 week prior to the present time point. The quantity of 611 is already being transported so that it can neither be increased nor decreased.

(1-2) The quantity of the in-process inventory A2 at the spot of 612 where T is 7 w will now be considered as a second example. The spot of 612 (7 w) is 1 week ahead from the time point (8 w) of material inventory B1 on the supplier 2 side, and it will take another 3 w until it turns into parts inventory B2 through manufacture. Here, the quantity of A2 at 612 is considered to have been obtained, similar to (1-1), from the quantity of delivery request after 8 weeks (C2 (4 w)+C3(4 w)=8 w) (quantity of parts required in 8 weeks) with respect to a delivery request that the buyer 1 has presented 1 week prior to the present time point. Since this quantity of 612 is already being manufactured, it can neither be increased nor decreased until it becomes parts inventory B2.

The same applies to the backlog of orders A3.

(2-1) The quantity of parts inventory B2 at the spot of 621 where T is 4 w will be considered as a first example related to the second estimating function 12. When the buyer 1 wishes to increase the quantity of delivery request in 7 weeks, the supplier 2 side can neither increase nor decrease the quantity on the basis of the above theory (1-2) (the quantity required in 7 w (612) is being manufactured) while it is possible to cope (comply) with the increase where a sufficient number of parts inventory B2 (particularly backup inventory) is present by utilizing this inventory. The quantity shown at 621 indicates an amount that can be utilized for coping (complying) with the above increase from among the entire parts inventory B2 (quantity of B2 of FIG. 6A).

Similar to the idea of above (2-1), it is possible to cope (comply) with requests for increase of the backlog of orders A3 which cannot be changed by using reserves of the material inventory B1 shown at 622.

[First Logic]

Figure 7:
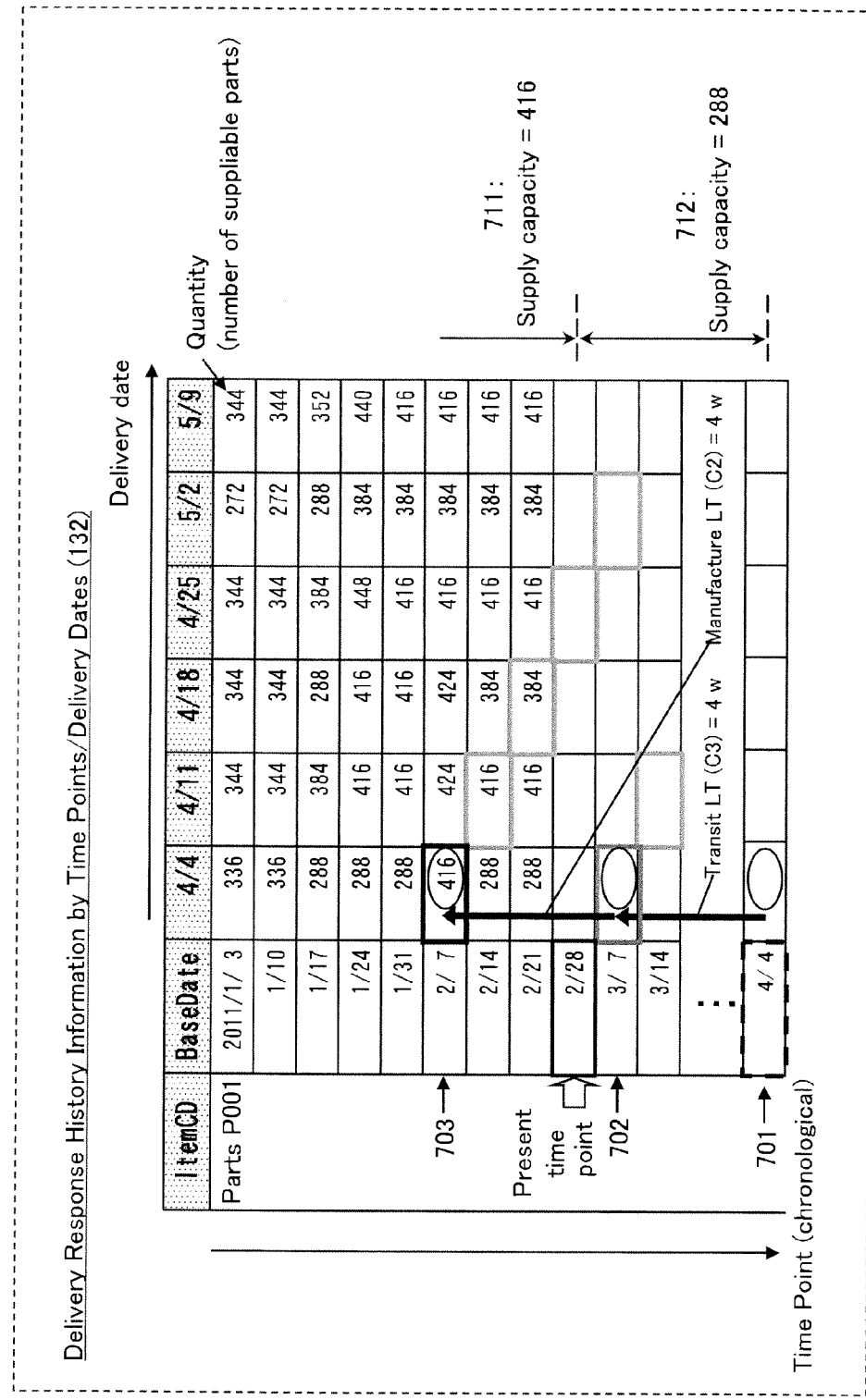
FIG. 7 is a diagram showing one example of values in a table showing delivery response history information (information by items and by time points)

The outline of the first logic according to the first estimating function 11 and an example thereof will be explained with reference to FIGS. 7 and 8. FIG. 7 shows one example of values of a table of delivery response history information 132 by time points/delivery dates. This table (information by time points/delivery dates) is created when the first estimating process is performed by the first estimating function 11. ItemCD indicates identification information of parts (for example, P001). BaseDate indicates reference dates (time points) which are aligned in chronological order in a downward direction (here, in units of 1 w). For instance, the present time point is 2011/2/28, wherein values (history) are present for periods preceding this record (2/21) while no values are stored for later dates. Items of delivery dates (dates (T=0) on which parts arrive at (are delivered to) the buyer 1 side (511)

in FIG. 5) are aligned in the right direction with respect to the BaseDates (time points). In each of the cells of the BaseDate/delivery date, values of number of suppliable parts included in the delivery responses of the supplier 2 are stored. For instance, in the case of 4/4, the quantities of the responses of the supplier 2 with respect to the required quantities of the buyer 1 (not shown) change from 336 to 288, to 416 and to 288.

When considering, for instance, the case of a delivery date of 4/4 (5 w from the present time point of 2/28) as a reference as at 701, the quantity of delivery response of the supplier 2 in reply to the delivery request that the buyer 1 has presented to the supplier 2 at time point 2/7 (703) preceding by 8 w which corresponds to the manufacture LT (C2=4 w)+transit LT (C3=4 w) of FIG. 5 is 416. It is possible to consider (estimate) that this value of 416 is the parts supply capacity (711) of the supplier 2 until time point 2/28. Similarly, where the quantity of the delivery response of the supplier 2 in reply to a delivery request that the buyer 1 has presented to the supplier 2 on 3/7 (702) which is a time point preceding by 4 w which corresponds to the transit LT (C3=4 w) is 288, it is possible to consider (estimate) that this value of 288 is the supplier supply capacity (712) for period ranging from 2/28 to 4/4.

Figure 8A:
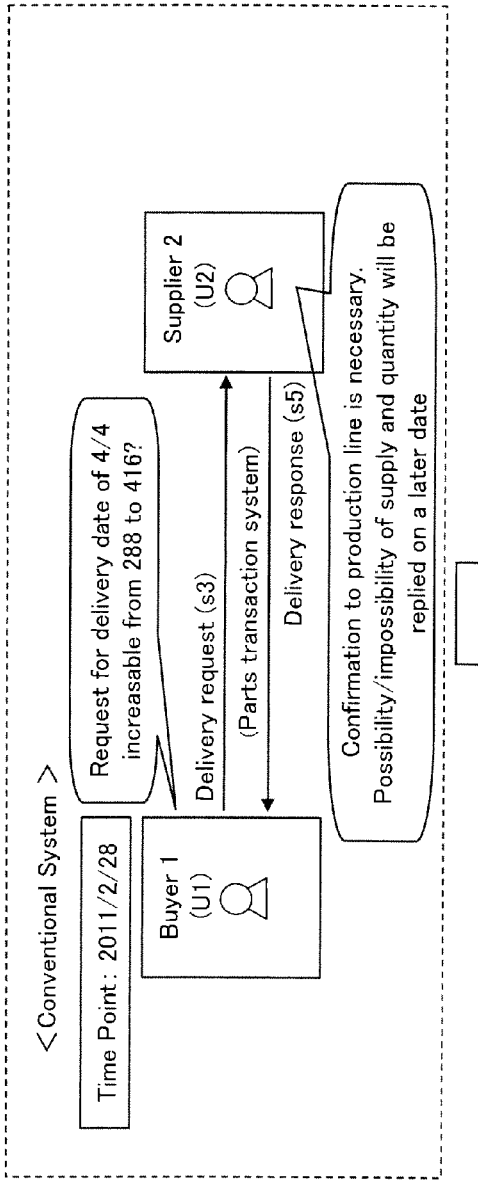
FIG. 8A is a diagram corresponding to FIG. 7 showing one example of delivery requests/delivery responses in a conventional system.

FIG. 8A is an example of delivery request (s3 in FIG. 4A)/delivery response (s4, s5) in a conventional system that corresponds to the table of FIG. 7. The present time point is deemed to be 2011/2/28. The buyer 1 (U1) has asked the supplier 2 (U2) as a delivery request (a3) "whether it is possible to increase the request (number of required parts) of delivery on 4/4 from 288 to 416". In reply thereto, the supplier 2 (U2) first replies that "confirmation to production line is necessary" while an official delivery response (s5) will be made at a later time with respect to concrete possibility/impossibility of supply and number of suppliable parts.

Figure 8B:
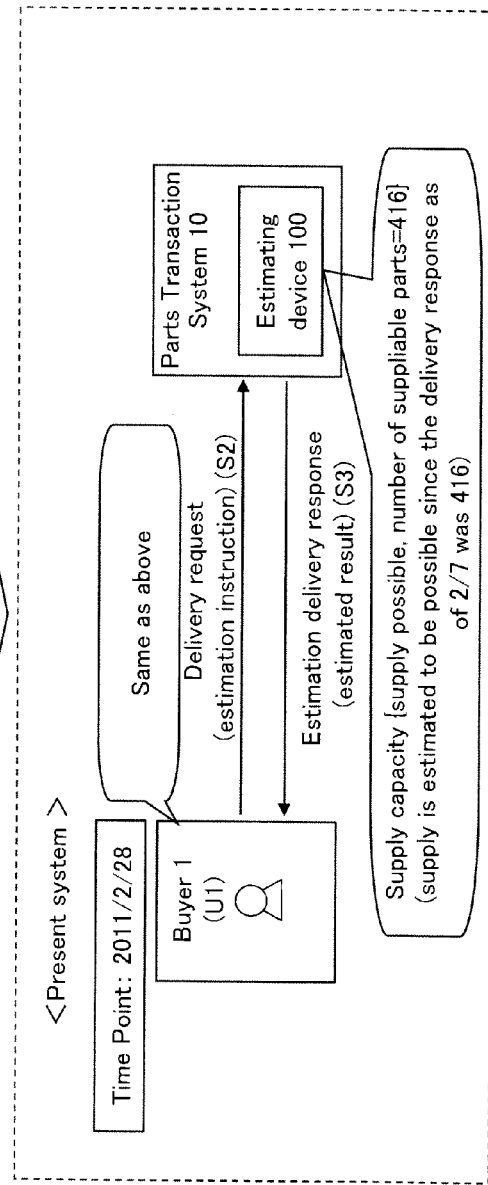
FIG. 8B is a diagram showing one example of delivery requests/delivery responses in the present system.

FIG. 8B is an example of delivery request (S2 in FIG. 4B)/delivery response (S3) in the system of the present embodiment that corresponds to the table of FIG. 7. The present time point is deemed to be 2011/2/28. The person in charge U1 of the buyer 1 has asked the estimating device 100 of the parts transaction system 10 "whether it is possible to increase the request (number of required parts) of delivery on 4/4 from 288 to 416". Alternatively, it is possible to make the device automatically execute estimation by making a delivery request by merely inputting 416 as the number of required parts or to separately input estimating instructions by a user (U1). In reply to the above delivery request (S2), the estimating device 100 executes an estimating process using the first estimating function 11 to reply as the estimated delivery response (S3) which is the result of estimation {supply capacity: suppliable, number of suppliable parts: 416} (it is estimated that an increase from 288 to 416 is possible due to the reason that the quantity in question is already being manufactured since the delivery response at the time point of 2/7 which precedes 4/4 by 8 w was 416). It is deemed that this estimation is possible since the quantity in question is already being manufactured based on the value of 416 of the past response on 2/7 which is retroacted with respect to the amount of the process LT (C3, C2) of the supplier 2 as shown in FIG. 7.

In this manner, according to the first logic, the supply capacity (possibility/impossibility of supply, number of suppliable parts, etc.) is estimated on the basis of A1 to A3 from quantities of delivery responses of past time points in which the process LT (C1 to C3) of the supplier 2 is offset from the reference time point (delivery date).

The range of retroaction (process levels) is selectable as be up to C3, up to C2 or up to C1.

[Second Logic]

The outline of the second logic according to the second estimating function 12 and an example thereof will be explained with reference to FIGS. 9A and 9B. FIG. 9A shows one example of values of a table of delivery response history information 132 (information by time points). Corresponding thereto, FIG. 9B shows one example of values of a table of delivery request history information 131 (information by time points). It should be noted that the designated item is parts P001.

In case of an increase in the delivery request (number of required parts) exceeding the supplier supply capacity (number of suppliable parts) according to the above-mentioned first logic (first estimating function 11), an estimated quantity (number of compliance) according to the second logic (second estimating function 12) is used. The number of compliance is obtained by calculating statistic values for each process how far actual delivery responses (number of suppliable parts) of the supplier 2 could have complied with increases in past delivery requests (number of required parts) of the buyer 1. Examples of such processes are the transit process (corresponding to C3) and manufacture process (corresponding to C2) in FIG. 5.

For instance, according to the delivery request history (131) of FIG. 9B, the buyer 1 has requested an increase by +64 with respect to the quantity of the delivery date 4/4 from the requested quantity of 416 as of 2011/2/7 to a requested quantity of 480 at the time point of 2/14. In reply thereto according to the delivery response history (132) of FIG. 9A, the supplier 2 has coped (complied) with an increase by +32 from the requested quantity of 416 as of 2/7 to a response quantity of 448 of 2/14. It is estimated that this amount has been covered by utilizing a reserve amount of the inventory (B2) as described above. In this respect, the transit process between time points 4/4 and 3/7 is 3 w and the manufacture process between time points 3/7 and 2/7 is 3 w in FIG. 9A.

In this case, the number of compliance between 2/7 and 2/14 is +32 with respect to +64. This can be expressed as a ratio of 50%. Accordingly, it can be estimated by the second estimating function 12 that possibilities that the supplier 2 makes a delivery response to comply within a similar range of numbers of compliance (+32) (50%) not only for the period of 2/7 to 2/14 but also on other dates are high.

[Basic Process]

Figure 10:
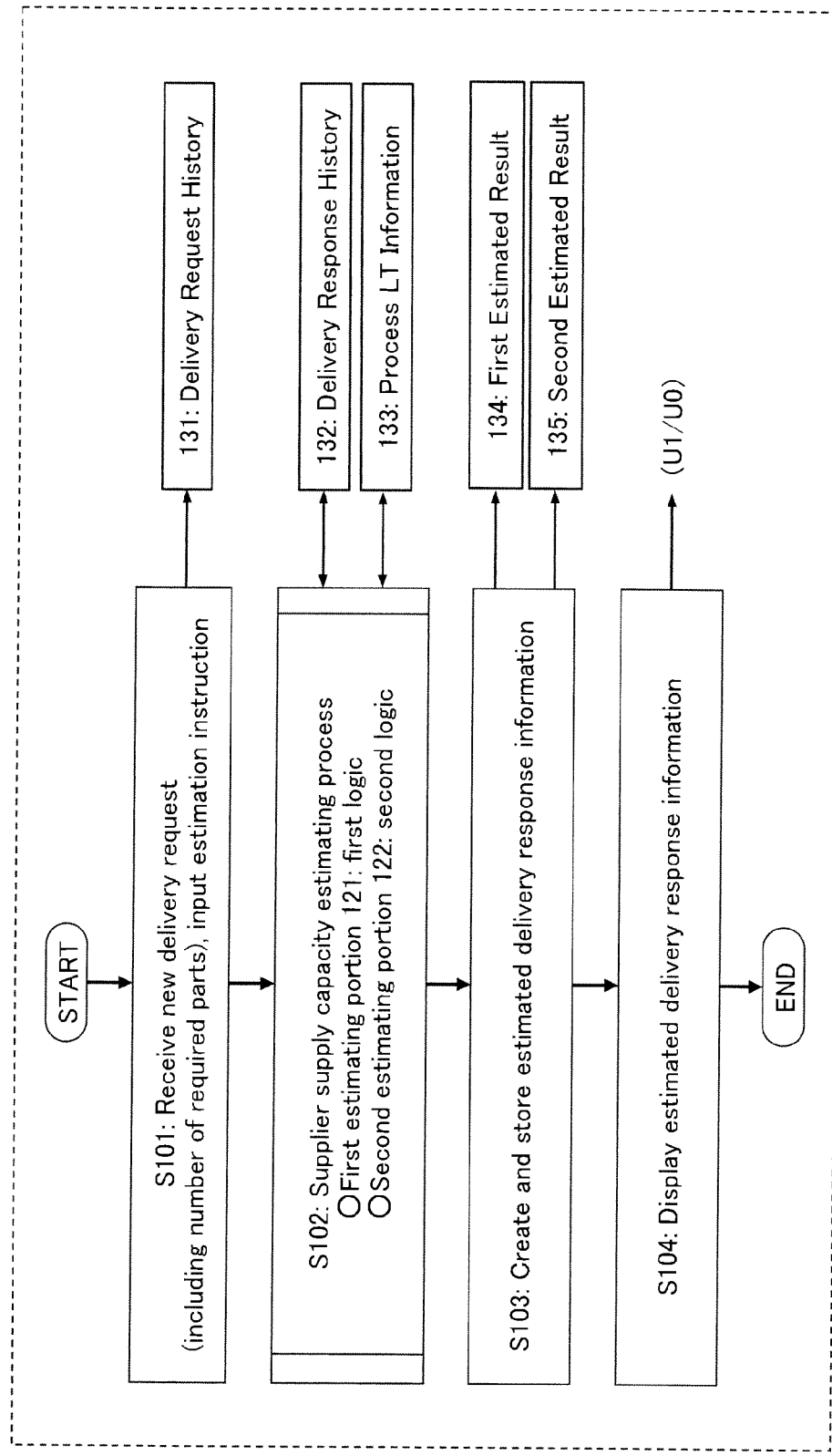
FIG. 10 is a diagram showing a basic process flow of the estimating device of FIG. 3.

FIG. 10 shows a basic process flow of the estimating device 100 of FIG. 3.

(S101) The new delivery request receiving portion 111 receives and inputs a new delivery request (number of required parts) from the buyer 1 (U1) as in S2 of FIG. 4. The new delivery request receiving portion 111 also inputs an estimation instruction to the estimating functions (11, 12). While estimating processes are here executed automatically by considering a new delivery request as an estimation instruction, it is also possible to employ a style in which the user (U1) separately inputs estimation instructions. It should be noted that the new delivery request information is stored as a part of the delivery request history 131.

(S102) Upon receipt of the information of S101, estimating processes are executed by the calculating portion 120. While both of the first estimating function 11 and the second estimating function 12 are used in the present embodiment, it is also possible to use only one of them.

The first estimating portion 121 performs the first estimating process according to the above-mentioned first logic for calculating the supplier supply capacity (estimated delivery response). The first estimating portion 121 refers to the delivery request history (131), the delivery response history (132) and the process LT information 133 from among the transaction history information DB 50 for calculating a supply capacity (number of suppliable parts, possibility/impossibility of supply) on the basis of A1 to A3 from quantities of delivery responses at past time points in which amounts of process LT of the supplier 2 have been offset as described above.

The second estimating portion 122 performs the second estimating process according to the above-mentioned second logic for calculating the supplier supply capacity (estimated delivery response) (particularly the number of compliance). The second estimating portion 122 refers to the delivery request history (131), the delivery response history (132) and the process LT information 133 from among the transaction history information DB 50 for calculating a supply capacity (number of suppliable parts, possibility/impossibility of supply) on the basis of B1 and B2 from numbers of compliance of the replied quantities of the supplier 2 in reply to an increase in quantities requested by the buyer 1 as described above.

(S103) The calculating portion 120 (121, 122) uses the results of S102 as estimated delivery responses (including information such as number of suppliable parts and possibility/impossibility of supply) to create first estimated results 134 and second estimated results 135 which are stored in the storing portion 130.

(S104) The estimated delivery response displaying portion 112 uses information (134, 135) from S103 for creating estimated delivery response information (including estimated supplier supply capacity information) for screen display, transmits the same to the buyer 1 and others for display (corresponding to S3 in FIG. 4). With this arrangement, the person in charge U1 of the buyer 1 or the production planner U0 can confirm estimated delivery response information of the supplier 2 on screen.

[Input Information]

FIGS. 11A to 11D indicate examples of input information data that are used for estimation. FIG. 11A is a table of delivery request history 131, FIG. 11B is a table of delivery response history 132, FIG. 11C is a table of new delivery requests, and FIG. 11D is a table of process LT information 133.

In the delivery request history 131 of FIG. 11A, values of required parts included in delivery requests are stored for time points 1/3, 1/10, 1/17 and 1/24 with respect to a delivery date of 2011/4/4 for parts P001 of company C which is the supplier 2.

In the delivery response history 132 of FIG. 11B, there is shown a case in which the same values as the delivery request history 131 of FIG. 11A are stored.

1101 of FIG. 11C indicates new delivery request information of certain dates, wherein values of required parts included in delivery requests are stored for time points 2011/4/4, 4/11, 4/18 and 4/25 for parts P001 of company C which is the supplier 2.

In the process LT information 133 of FIG. 11D, information regarding "process level" or "process LT" are managed for respective parts such as parts P001 of company C or parts P001 of company S which are the suppliers 2. Values in the row of "process level" indicate distinctions such as the above-described parts transit LT (C3), parts manufacture LT (C2) and material procurement LT (C1) while "process LT" indicate their times in units of weeks (w). For instance, a process level of 1 corresponds to parts transit LT (C3) and a process level of 2 corresponds to parts manufacturing LT (C2).

[First Estimating Process]

Figure 12:
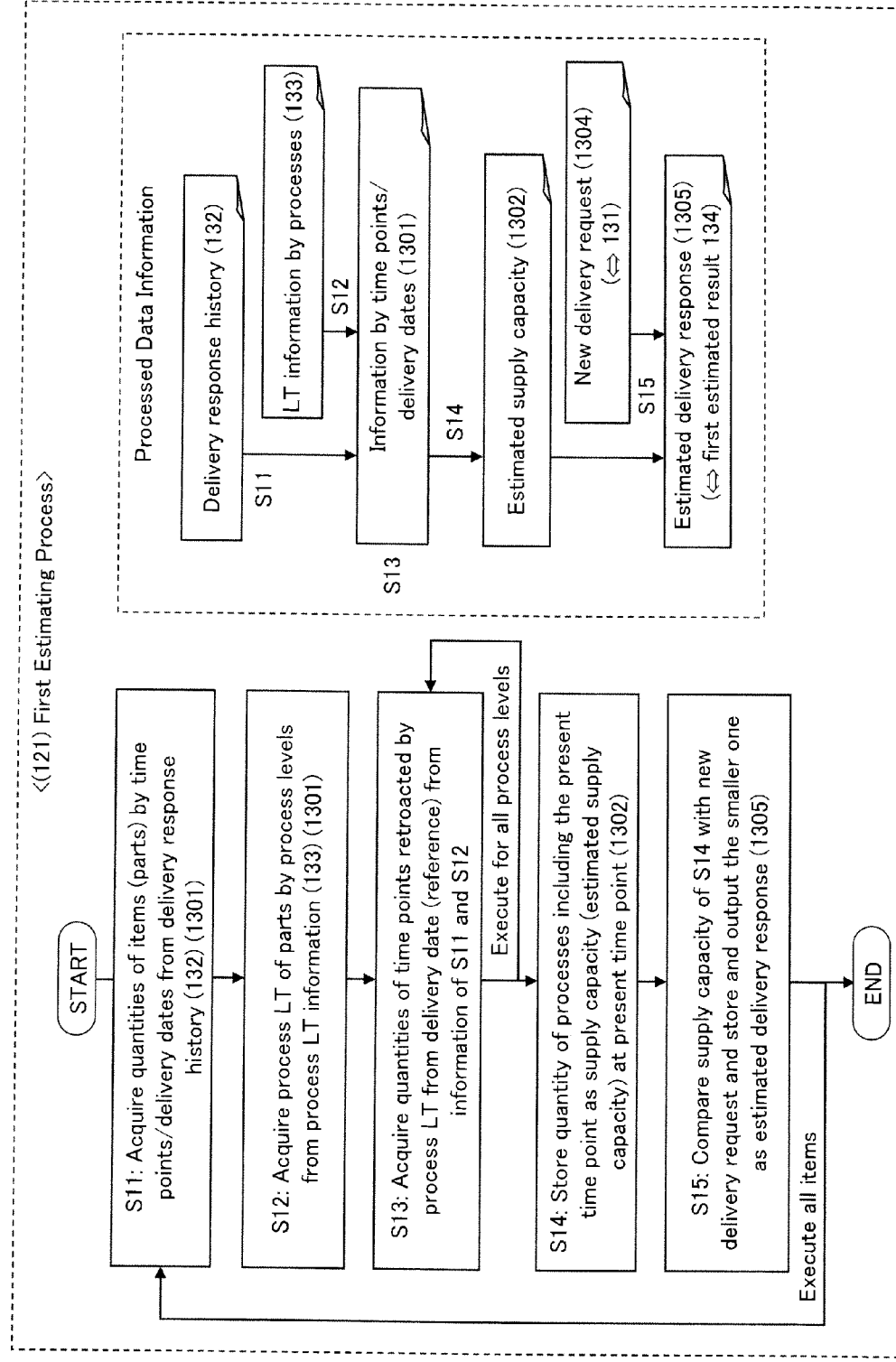
FIG. 12 is a diagram showing a first estimating process flow of a first estimating portion.

FIG. 12 shows a first estimating process flow (S11 and others indicate process steps) according to the first estimating function (first estimating portion 121). It should be noted that examples of processed data information (table) of the storing portion 130 corresponding to the process steps S11, etc. on the left-hand side are indicated on the right-hand side and in a different drawing.

(S11) The first estimating portion 121 acquires quantities by time points/delivery dates for objective items (parts) from the delivery response history 132 and stores them in the table for processing.

Figure 13:
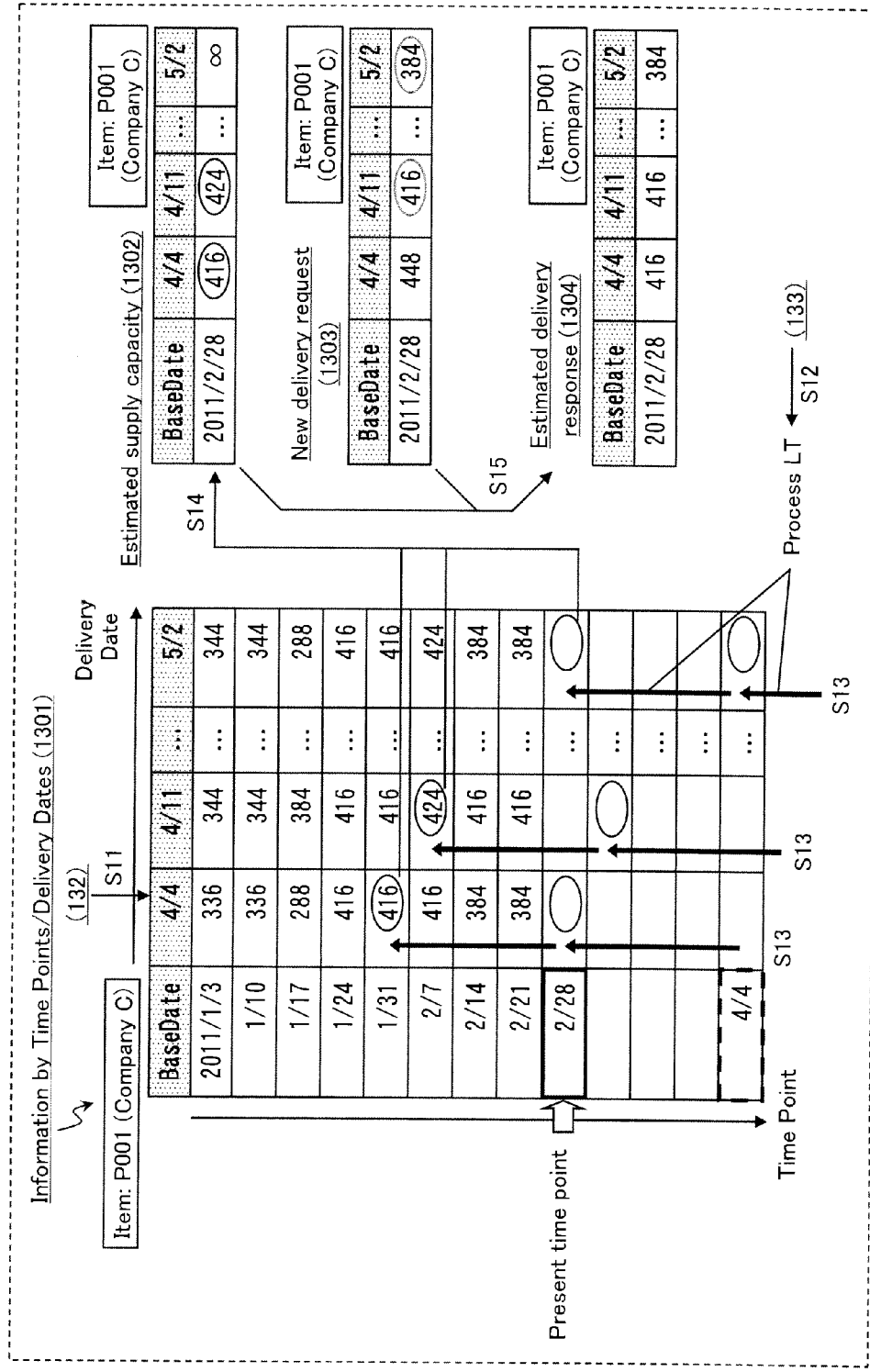
FIG. 13 is a diagram showing a table of information by time points and by delivery dates in the first estimating process.

For instance, values are stored as information (table) by items, time points, and delivery dates of 1301 of FIG. 13. Values of lines 1 to 4 in the table of 132 of FIG. 11B are stored in corresponding rows of the table of information 1301.

(S12) The portion 121 acquires information related to process LT of the parts in question from the process LT information 133 by respective process levels (C1, C2, C3).

For instance, values of lines 1 to 2 in the table of 133 in FIG. 11D (4 w for process level of 1 (C3), 4 w for process level of 2 (C2)) are acquired.

(S13) The portion 121 acquires quantities of past time points by offsetting (retroacting) from the reference time point by amounts of the process LT of the parts in question using information of the above S11 and S12. The portion 121 similarly executes (repeats) this process by amounts of process levels.

For instance, quantities of time points retroacted by respective process LT from time points of reference delivery dates in the table 1301 are acquired by respective process levels as in FIG. 13. For instance, the quantity of 416 of 1/31 which is a time point that has been retroacted by 4 w+4 w=8 w from a reference delivery date of 4/4 will be the quantity of process level 2 of a delivery date of 4/4. Similarly, for instance, the quantity of 424 of 2/7 which is a time point that has been retroacted by 4 w+4 w=8 w from a reference delivery date of 4/11 will be the quantity of process level 2 of a delivery date of 4/11.

(S14) The portion 121 defines the quantities of process levels including the present time point from among the quantities of past time points that have been acquired by process levels in S13 as a supplier supply capacity (estimated supply capacity) at the present time point and this information is stored in the storing portion 130 as a part of the first estimated result 134.

For instance, as in FIG. 13, quantity values of estimated supply capacities (416, 416, ... infinity) are stored by respective delivery dates (4/4, 4/11, ..., 5/2) at reference time point 2/28 as records of estimated supply capacities of 1302.

(S15) The portion 121 compares the estimated supply capacity information of S14 (1302) with new delivery requests (1101 in FIG. 11C) to store the smaller ones (416, 416, ..., 384) of the quantity values of the estimated supply capacity for the respective delivery dates (4/4, 4/11, ..., 5/2) as records of estimated delivery response information of 1304 for storing and outputting them as the first estimated results 134.

The portion 121 similarly executes (repeats) the processes of S11 to S15 for all items (parts).

[Second Estimating Process]

Figure 14:
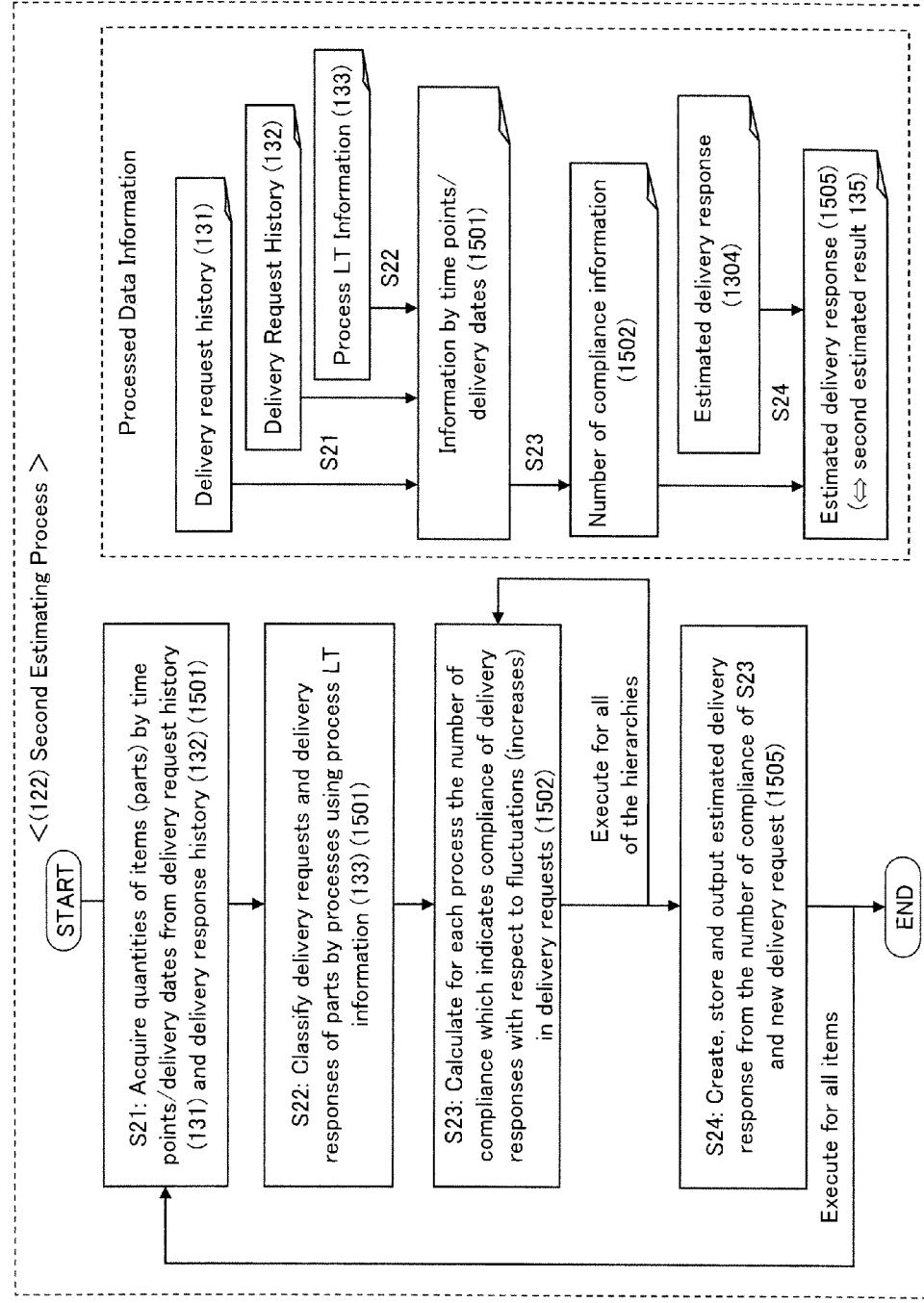
FIG. 14 is a diagram showing a second estimating process flow of a second estimating portion.

FIG. 14 shows a second estimating process flow (S21 and others indicate process steps) according to the second estimating function (second estimating portion 122). It should be noted that examples of processed data information (table) of the storing portion 130 corresponding to the process steps S21, etc. on the left-hand side are indicated on the right-hand side and in a different drawing.

(S21) First, the second estimating portion 122 acquires quantities of parts by time points/delivery dates from the delivery request history 131 and the delivery response history 132 and stores them in a table for processing.

Figure 15:
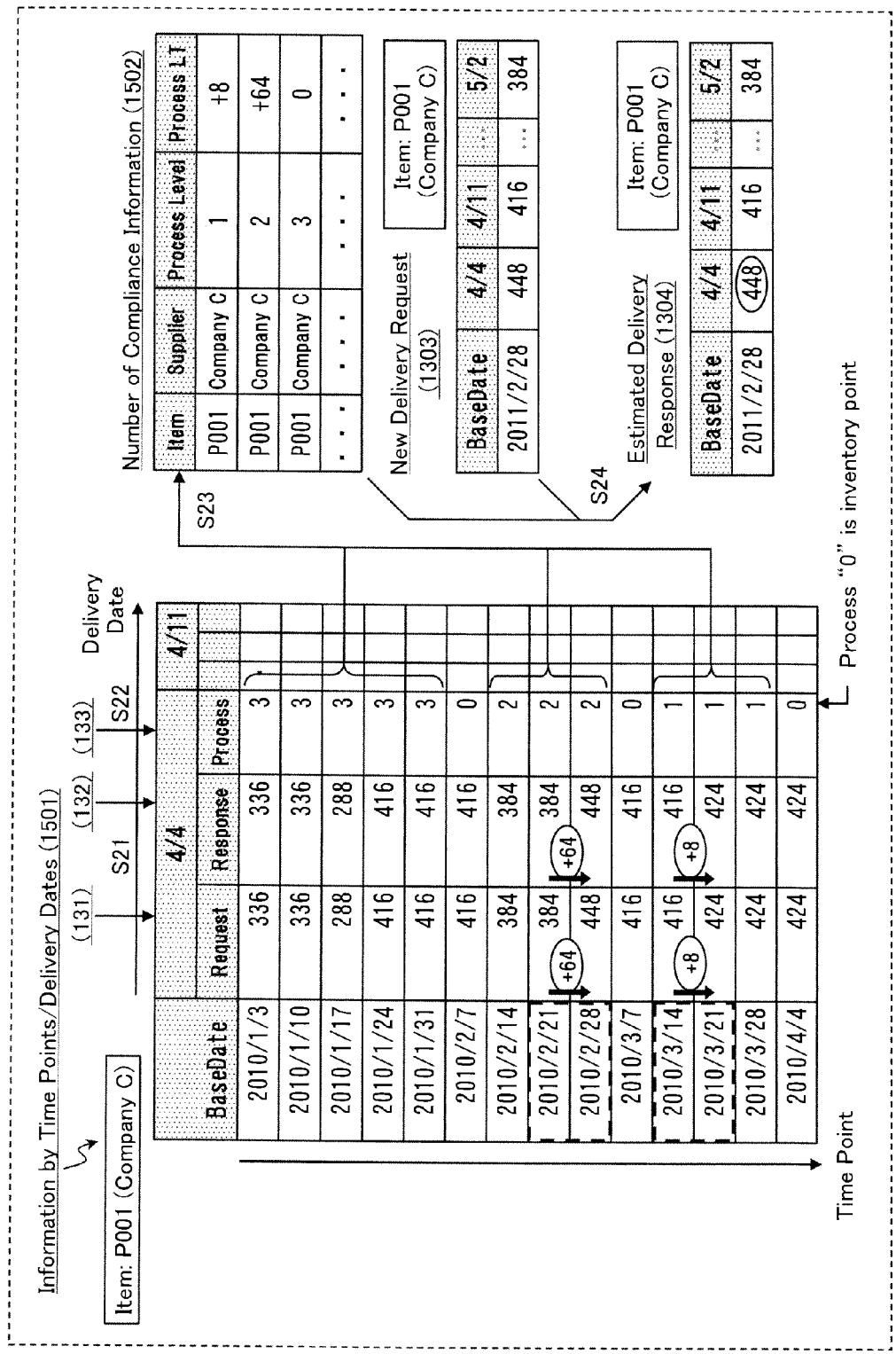
FIG. 15 is a diagram showing a table of information by time points and by delivery dates in the second estimating process.

For instance, as in FIG. 15, values of lines 1 to 4 of the tables of 131 in FIGS. 11A and 132 in FIG. 11B are stored in corresponding rows of information (table) by items, time points, and delivery dates of 1501.

(S22) The portion 122 classifies delivery requests and delivery responses of parts in question from process LT information 133 by respective processes.

For instance, values of lines 1 to 2 of the table of 133 in FIG. 11D (same as above) are acquired as in FIG. 15. In the rows of respective delivery dates in the table 1501 of information by items and time points, values of process levels are stored in the "process" rows, the quantities of delivery request are stored in the "request" rows, and corresponding quantities of delivery responses are stored in the "response" rows. In this respect, "process"=0 indicates inventory points (corresponding to B1, B2).

In the table of 1501, in comparing the quantity of delivery date 4/4 with time points of reference dates 2/21 and 2/28 where "process"=2, the requested quantity has increased from 384 to 448. In reply thereto, the response quantity has increased from 384 to 448 to comply with. The each increase in number is +64. Similarly, on reference dates 3/14 and 3/21 where "process"=1 is satisfied, the requested quantity has increased from 416 to 424 whereas the response quantity has also increased from 416 to 424 to comply with, and the increase in number is +8.

(S23) The portion 122 calculates, by each process, the number of compliance which indicates to what extent the quantity of response has complied with the increase in requested quantity. The portion 122 executes (repeats) the same processes for process levels. In this respect, the information related to the calculated number of compliances is stored as a part of the second estimated results 135.

For instance, a table (record) of number of compliances of 1502 is created as in FIG. 15. In the table of 1501, since the amount of increase from 2/21 to 2/28 is +64 at a spot where "process"=2 is satisfied, a record is stored as the number of compliance of 1502 stating that "process level"=2, "number of compliance"=+64. Similarly, since the amount of increase from 3/14 to 3/21 is +8 at a spot where "process"=1 is satisfied, records is stored as the number of compliance of 1502 stating that "process level"=1, "number of compliance"=+8.

(S24) The portion 122 creates an estimated delivery response (for instance, 1504) from the number of compliance of S23 (for instance, 1502) and the new delivery request (for instance, 1503 which is based on 1101 of FIG. 11C) which is stored and output as the second estimated result 135. For instance, suppose that the quantity on the delivery date of 4/4 of an estimated delivery response (1304) as of time point 2/28 was 416 as shown in FIG. 13. Since the process level is 2 on the delivery date 4/4 as of the time point 2/28, the number of compliance +64 of the process level 2 of company C that manufactures items P001 will be a number that is replied as a number that is further compliable from 416 based on information regarding the number of compliance (1502). The required number for a delivery date of 4/4 of a new delivery request (1503) is 448, and while this is larger by 32 than 416 of the estimated delivery response (1304), it is determined that this number can be complied with since it is within the number of compliance of +64 so that the amount of the estimated delivery response (1504) for delivery date 4/4 will be 448.

The portion 122 similarly executes (repeats) the processes of S21 to S24 for all items (parts).

[Screen Example]

FIG. 16 shows an example of a display screen of estimated delivery response (estimated supply capacity) information that is displayed to users (person in charge U1 of the buyer 1 or production planner U0) through processes of the estimated delivery response displaying portion 112 of the estimating device 100. The contents of display of this screen are created using the first estimated results 134 and second estimated results 135, etc. Letters, tables and operation buttons are indicated as shown in the drawing, for instance, in web page format. The table as illustrated herein includes headings such as item (parts), supplier, adjustment needed and respective delivery dates. In connection with the respective delivery dates, quantities and various related information are displayed. Such related information might, for instance, be a blue star mark that is displayed when the first estimating function 11 (first logic) has made an "OK" judgment. A green star mark is displayed when the second estimating function 12 (second logic) has made an "OK" judgment. An "OK" judgment corresponds to an estimated result that possibilities that the required number of parts (or the amount of increase) of the delivery request can be supplied are sufficiently high. Where the estimated result is a "NG" judgment, the quantity of shortage in the delivery response (estimation) with respect to a delivery request is emphasized and displayed, for instance, in red and a circle mark is indicated for the heading of "adjustment needed".

Upon confirming the estimated delivery response information on the present screen and the response is "OK", the user (U1 or U0) can immediately coordinate for establishing production plans (S4). It is possible to employ an arrangement in which button for coordination is provided on the screen of FIG. 16. Where the response is "NG" (circle mark indicated for "adjustment needed"), it is possible to attend adjustments (202 of FIG. 4) via conventional routes. It is possible to employ an arrangement in which button for adjustment is provided on the screen of FIG. 16. It is also possible to move to already existing other information display screens such as those of transaction information displaying function 20 etc.

[Effects and Others]

As explained so far, according to the present embodiment, the buyer 1 (U1), for instance, can confirm automatically estimated results of the supply capacities (number of suppliable parts) of suppliers 2 in reply to delivery requests (number of required parts, etc.) on the screen so that it is possible to immediately coordinate with production plan adjustments (determination) without awaiting delivery responses of suppliers 2 (U2). With this arrangement, it is possible to anticipate large reductions in time required for production plan adjustments (203 of FIG. 4). Through these effects, it is possible to expect increases in sales and reductions in inventory which is enabled through rapid responses to fluctuations in demand.

It should be noted that while the system of the present embodiment is equipped with both of the first estimating function 11 and second estimating function 12, it might be a system equipped with only one of these functions.

It should be noted that there might be deviations between estimated values and actual values (for instance, response values of the suppliers 2 (U2)) as long as they are estimations made by the estimating functions (11, 12) of the present system, it is possible to treat these functions as follows.

(1) The functions might be utilized as a system/service on the premise that estimations and deviations are preliminarily allowed for on the basis of contracts between buyers 1 and suppliers 2 (as well as contracts among enterprises providing the parts transaction system 10 or the estimating device 100). For instance, the buyer 1 performs parts orders and production plan adjustments while anticipating possibilities of deviations.

(2) In accordance with occurrence of a deviation, the buyer 1 (person in charge U1) coordinates with the supplier 2 (person in charge U2) upon making an alarm notice. In this case, the parts transaction system 10 and the estimating device 100 are equipped with an alarm noticing function. The supplier 2 (person in charge U2) utilizes the alarm notice for adjustments and business improvements.

While an invention that has been made by the present inventor has been concretely described above based on an embodiment thereof, the present invention is not to be limited to the above embodiment, and it goes without saying that the present invention can be diversely changed without departing from the spirit and scope thereof.

The present invention is applicable to system used for SCM, production management, procurement management or electronic commerce.

What is claimed is:

1. A supply capacity estimating system that performs information process for supporting transaction of parts between a buyer and a supplier by using at least one computer using a communication network, the supply capacity estimating system comprising the at least one computer comprising:

a storing portion configured to store and manage transaction information of the parts including information of delivery requests including the number of required parts from the buyer and information of delivery responses including the number of suppliable parts from the supplier on a database (DB) in chronological order as transaction history information; and a calculating portion configured to perform processes of estimating the parts supply capacity of the supplier with respect to delivery responses of the supplier in reply to delivery requests of the buyer, the calculating portion configured to perform:

a process of acquiring, from the DB, delivery request history information related to the delivery request of the buyer;

a process of acquiring, from the DB, delivery response history information related to the delivery response of the supplier;

a process of acquiring or inputting process lead time information related to provision of parts from the supplier;

wherein the calculating portion comprises:

a first estimating portion configured to perform processes of estimating the number of suppliable parts of the delivery response with respect to the required number of present or future delivery request as the supply capacity by referring to numbers of suppliable parts of delivery response in reply to required numbers of delivery requests at past time points that have been retroacted by process lead times from a reference delivery date of parts to the buyer for each of the parts by using the delivery request history information, the delivery response history information and the process lead time information, wherein the process lead time information includes a first process lead time for transporting parts from the supplier to the buyer related to inventory in transit on the supplier side, and wherein the first estimating portion is configured to perform processes of estimating a quantity value based on the inventory in transit on the supplier side as the supply capacity by the referring to the numbers of suppliable parts of delivery response in reply to the required numbers of delivery requests at past time points that have been retroacted by the first process lead times from a reference delivery date of parts to the buyer; and a process of outputting a screen including the estimated result information to the user.

2. The supply capacity estimating system according to claim 1, wherein the process lead time information includes a second process lead time for manufacturing parts from raw materials on the supplier side related to in-process inventory on the supplier side, and wherein the first estimating portion is configured to perform processes of estimating a quantity value based on the inventory in transit and the in-process inventory on the supplier side as the supply capacity by referring to numbers of suppliable parts of delivery responses in reply to required numbers of delivery requests at past time points that have been retroacted by the first process lead times and the second process lead times from a reference delivery date of parts to the buyer.

3. The supply capacity estimating system according to claim 2, wherein the process lead time information includes a third process lead time for procurement of raw materials from the supplier side related to backlog of orders on the supplier side, and wherein the first estimating portion is configured to perform processes of estimating a quantity value based on the inventory in transit, the in-process inventory, and the backlog of orders on the supplier side as the supply capacity by referring to numbers of suppliable parts of delivery responses in reply to required numbers of delivery requests at past time points that have been retroacted by the first process lead times, the second process lead times and the third process lead times from a reference delivery date of parts to the buyer.

4. The supply capacity estimating system according to claim 1, wherein the calculating portion comprises a second estimating portion configured to calculate, by referring to amounts of fluctuation in required numbers among delivery requests of the buyer at time points in the past and to amounts of fluctuation in the numbers of suppliable parts among corresponding delivery responses of the suppliers at time points in the past by respective parts using the delivery request history information, the delivery response history information and the process lead time information, an index value which represents a degree of compliance of the supplier side with respect to such fluctuations, and for performing processes of estimating numbers of suppliable parts of delivery responses with respect to required numbers of present or future delivery requests as the supply capacity on the basis of the index value.

5. The supply capacity estimating system according to claim 4, wherein the second estimating portion is configured to calculate, by referring to amounts of increase in the required number among delivery requests of the buyer at time points in the past and to number of suppliable parts among corresponding delivery responses of the suppliers at time points in the past, an index value which represents a degree of compliance of the supplier side with respect to such increases on the assumption that treatments are made using reserve amounts of parts inventory and raw material inventory on the supplier side, and performs processes of estimating numbers of suppliable parts of delivery responses with respect to required numbers of present or future delivery requests as the supply capacity on the basis of the index value.

6. The supply capacity estimating system according to claim 1, the calculation portion comprising:

a new delivery request receiving portion configured to receive information of a delivery requests of the parts that has been newly created by a person in charge of the buyer; and an estimated delivery response displaying portion configured to perform processes of generating a screen including estimated delivery response information including the estimated result information obtained in reply to input of information related to the new delivery request and of displaying the screen to the person in charge of the buyer.

7. The supply capacity estimating system according to claim 1, wherein the first estimating portion is configured to perform:

a process of acquiring quantity values by parts, by time points and by delivery dates from the delivery response history information;

a process of acquiring the numbers of suppliable parts of delivery responses in reply to number of required parts of delivery requests at past time points that have been retroacted by process lead times from reference delivery dates from the process lead time information;

a process of defining the quantity values of processes including the present time point as an estimated supply capacity at the present time point and storing the estimated supply capacity information; and a process of comparing the estimated supply capacity information and the new delivery request information and storing a quantity value of the smaller one as the estimated delivery response information.

8. The supply capacity estimating system according to claim 4, wherein the second estimating portion is configured to perform:

a process of acquiring quantity values by parts, by time points and by delivery dates from the delivery request history information and the delivery response history information;

a process of classifying the delivery requests and delivery responses of the parts for each process from the process lead time information;

a process of calculating the index value by using the amount of fluctuation among the delivery responses with respect to the amount of fluctuation among the delivery requests for each process; and a process of estimating a number of suppliable parts of an estimated delivery response as the supply capacity by using the index value and the number of required parts of the new delivery request information.

9. The supply capacity estimating system according to claim 1, wherein pieces of information regarding parts, supplier, delivery dates and estimated numbers of suppliable parts of the delivery dates are displayed on the screen including the estimated result information.

10. The supply capacity estimating system according to claim 9,
wherein pieces of judgment result information are displayed on the screen including the estimated result information,
wherein the estimating portion is configured to make judgments as the judgment result information in a manner such that an OK judgment is made when it is possible to cover the number of required parts of the delivery request by the number of suppliable parts of the estimated delivery response while an NG judgment is made when supply is impossible, and when an NG judgment is made, information indicating that adjustments are necessary is displayed on the screen and enabling coordination to a screen for adjustment between the buyer and supplier.

11. A supply capacity estimating system that is connected to or incorporated in a parts transaction system that performs information processing for supporting transaction of parts between a buyer and a supplier by using at least one computer using a communication network, the parts transaction system including the at least one computer comprising:
A controlling portion configured to register and display, on a screen, transaction information of the parts including information of delivery requests including the number of required parts from the buyer and information of delivery responses including the number of suppliable parts from the supplier,
A storing portion configured to store and manage transaction information of the parts obtained by the transaction information displaying function on a database (DB) in chronological order as transaction history information, and
the supply capacity estimating system comprising at least one computer comprising:
a calculating portion configured to perform processes of estimating the parts supply capacity of the supplier with respect to a delivery response of the supplier in reply to a delivery request of the buyer, wherein the calculating portion is configured to perform:
a process of acquiring, from the parts transaction system, delivery request history information related to the delivery request of the buyer;
a process of acquiring, from the parts transaction system, delivery response history information related to the delivery response of the supplier;
a process of acquiring or inputting process lead time information related to provision of parts from the supplier;
wherein the calculating portion comprises:
a first estimating portion configured to perform processes of estimating the number of suppliable parts of the delivery response with respect to the required number of present or future delivery request as the supply capacity by referring to numbers of suppliable parts of delivery response in reply to required numbers of delivery requests at past time points that have been retroacted by process lead times from a reference delivery date of parts to the buyer for each of the parts by using the delivery request history information, the delivery response history information and the process lead time information, wherein the process lead time information includes a first process lead time for transporting parts from the supplier to the buyer related to inventory in transit on the supplier side, and
wherein the first estimating portion is configured to perform processes of estimating a quantity value based on the inventory in transit on the supplier side as the supply capacity by the referring to the numbers of suppliable parts of delivery response in reply to the required numbers of delivery requests at past time points that have been retroacted by the first process lead times from a reference delivery date of parts to the buyer; and
a process of outputting a screen including the estimated result information to the user.

12. A supply capacity estimating method for performing information processing for supporting transaction of parts between a buyer and a supplier by using at least one computer using a communication network, the supply capacity estimating method comprising:
a process step of registering and displaying, using the at least one computer, transaction information of the parts including information of delivery requests including the number of required parts from the buyer and information of delivery responses including the number of suppliable parts from the supplier;
a process step for storing and managing, using the at least one computer, transaction information of the parts on a DB in chronological order as transaction history information; and
an estimating process step for performing, using the at least one computer, processes of estimating the parts supply capacity of the supplier with respect to a delivery response of the supplier in reply to a delivery request of the buyer,
the estimating process step including:
a process step of acquiring, using the at least one computer, from the DB, delivery request history information related to the delivery request of the buyer;
a process step of acquiring, using the at least one computer, from the DB, delivery response history information related to the delivery response of the supplier;
a process step of acquiring or inputting, using the at least one computer, process lead time information related to provision of parts from the supplier;
wherein the calculating portion comprises:
a first estimating portion configured to perform processes of estimating the number of suppliable parts of the delivery response with respect to the required number of present or future delivery request as the supply capacity by referring to numbers of suppliable parts of delivery response in reply to required numbers of delivery requests at past time points that have been retroacted by process lead times from a reference delivery date of parts to the buyer for each of the parts by using the delivery request history information, the delivery response history information and the process lead time information, wherein the process lead time information includes a first process lead time for transporting parts from the supplier to the buyer related to inventory in transit on the supplier side, and
wherein the first estimating portion is configured to perform processes of estimating a quantity value based on the inventory in transit on the supplier side as the supply capacity by the referring to the numbers of suppliable parts of delivery response in reply to the required numbers of delivery requests at past time points that have been retroacted by the first process lead times from a reference delivery date of parts to the buyer; and
a process step of outputting a screen including the estimated result information to the user.

13. A non-transitory computer recording medium recorded therein a supply capacity estimating program for making at least one computer perform information processing for supporting transaction of parts between a buyer and a supplier using a communication network, the information process comprising:

registering and displaying, using the at least one computer, transaction information of the parts including information of delivery requests including the number of required parts from the buyer and information of delivery responses including the number of suppliable parts from the supplier;

storing and managing, using at least one computer, transaction information of the parts on a database (DB) in chronological order as transaction history information; and performing an estimating process of estimating, using the at least one computer, the parts supply capacity of the supplier with respect to a delivery response of the supplier in reply to a delivery request of the buyer;

the estimating processes including:

a process of acquiring, using the at least one computer, from the DB, delivery request history information related to the delivery request of the buyer;

a process of acquiring, using the at least one computer, from the DB, delivery response history information related to the delivery response of the supplier;

a process of acquiring, using the at least one computer, process lead time information related to provision of parts from the supplier;

wherein the calculating portion comprises:

a first estimating portion configured to perform processes of estimating the number of suppliable parts of the delivery response with respect to the required number of present or future delivery request as the supply capacity by referring to numbers of suppliable parts of delivery response in reply to required numbers of delivery requests at past time points that have been retroacted by process lead times from a reference delivery date of parts to the buyer for each of the parts by using the delivery request history information, the delivery response history information and the process lead time information, wherein the process lead time information includes a first process lead time for transporting parts from the supplier to the buyer related to inventory in transit on the supplier side, and wherein the first estimating portion is configured to perform processes of estimating a quantity value based on the inventory in transit on the supplier side as the supply capacity by the referring to the numbers of suppliable parts of delivery response in reply to the required numbers of delivery requests at past time points that have been retroacted by the first process lead times from a reference delivery date of parts to the buyer; and a process of outputting a screen including the estimated result information to the user.

* * * * *